US012726956B2

(12) United States Patent
Liu

(10) Patent No.: US 12,726,956 B2
(45) Date of Patent: Sep. 1, 2026

(54) CHANNEL TRANSMISSION METHOD AND DEVICE, AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 404 days.

(21) Appl. No.: 18/546,296

(22) PCT Filed: Feb. 25, 2021

(86) PCT No.: PCT/CN2021/077979

§ 371 (c)(1),
(2) Date: Aug. 14, 2023

(87) PCT Pub. No.: WO2022/178787

PCT Pub. Date: Sep. 1, 2022

(65) Prior Publication Data

US 2024/0121764 A1 Apr. 11, 2024

(51) Int. Cl.
*H04W 72/0446* (2023.01)
*H04W 72/232* (2023.01)

(52) U.S. Cl.
CPC ..... *H04W 72/0446* (2013.01); *H04W 72/232* (2023.01)

(58) Field of Classification Search
CPC ........................ H04W 72/0446; H04W 72/232
See application file for complete search history.

(56) References Cited

U.S. PATENT DOCUMENTS

2020/0351844 A1* 11/2020 Rico Alvarino ...... H04L 1/1819
2021/0329535 A1* 10/2021 Chou .................... H04L 1/0009
2022/0159706 A1* 5/2022 Panteleev ............ H04L 5/0094
2022/0225365 A1* 7/2022 Cozzo ................... H04W 72/23

FOREIGN PATENT DOCUMENTS

CN 110460419 A 11/2019

OTHER PUBLICATIONS

International Search Report and Written Opinion of International Application No. PCT/CN2021/077979, dated Nov. 25, 2021, 14 pages.
Extended European Search Report issued in Application No. 21927225.9 dated Mar. 20, 2024, 8 pages.

(Continued)

*Primary Examiner* — Elton Williams
(74) *Attorney, Agent, or Firm* — Finnegan, Henderson, Farabow, Garrett & Dunner, L.L.P.

(57) ABSTRACT

A channel transmission method is performed by a terminal, and includes: determining a maximum number of repetitions of repeatedly transmitting a target physical uplink shared channel (PUSCH), the maximum number of repetitions being located within a preset range; determining a number of actual repetitions based on the maximum number of repetitions; determining a plurality of available uplink time domain transmission resources for repeatedly transmitting the target PUSCH based on the number of actual repetitions; and transmitting the target PUSCH repeatedly on the plurality of available uplink time domain resources.

19 Claims, 14 Drawing Sheets

(56) References Cited

OTHER PUBLICATIONS

Moderator (Sharp), "FL Summary on Enhancements on PUSCH repetition type A," 3GPP TSG RAN WG1 #104-e, R1-2102113, e-Meeting, Jan. 25-Feb. 5, 2021, 67 pages.
Vivo, "Discussion on enhancement for PUSCH repetition type A," 3GPP TSG RAN WG1 #104-e, R1-2100457, e-Meeting, Jan. 25-Feb. 5, 2021, 4 pages.

* cited by examiner sending a RRC parameter, in which the RRC parameter is configured to indicate a terminal a maximum number of repetitions of repeatedly transmitting a target PUSCH, and the maximum number of repetitions is located within a preset range, the preset range includes a first range, and an upper limit of the first range is greater than 16

401 base station terminal step 601, sending a RRC parameter, the RRC parameter is configured to indicate a terminal a maximum number of repetitions of repeatedly transmitting a target PUSCH, and the maximum number of repetitions is located within a preset range, the preset range includes a first range, and an upper limit of the first range is greater than 16 step 602, in response to not receiving DCI that indicates the number of actual repetitions, determining the maximum number of repetitions as the number of actual repetitions step 603, determining a plurality of available uplink time domain transmission resources in a plurality of sequentially determined time domain transmission resources based on a preset time domain transmission resource configuration mode by skipping unavailable time domain transmission resources, until a number of the plurality of available uplink time domain transmission resources is identical to the number of actual repetitions step 604, transmitting the target PUSCH repeatedly on the plurality of available uplink time domain resources

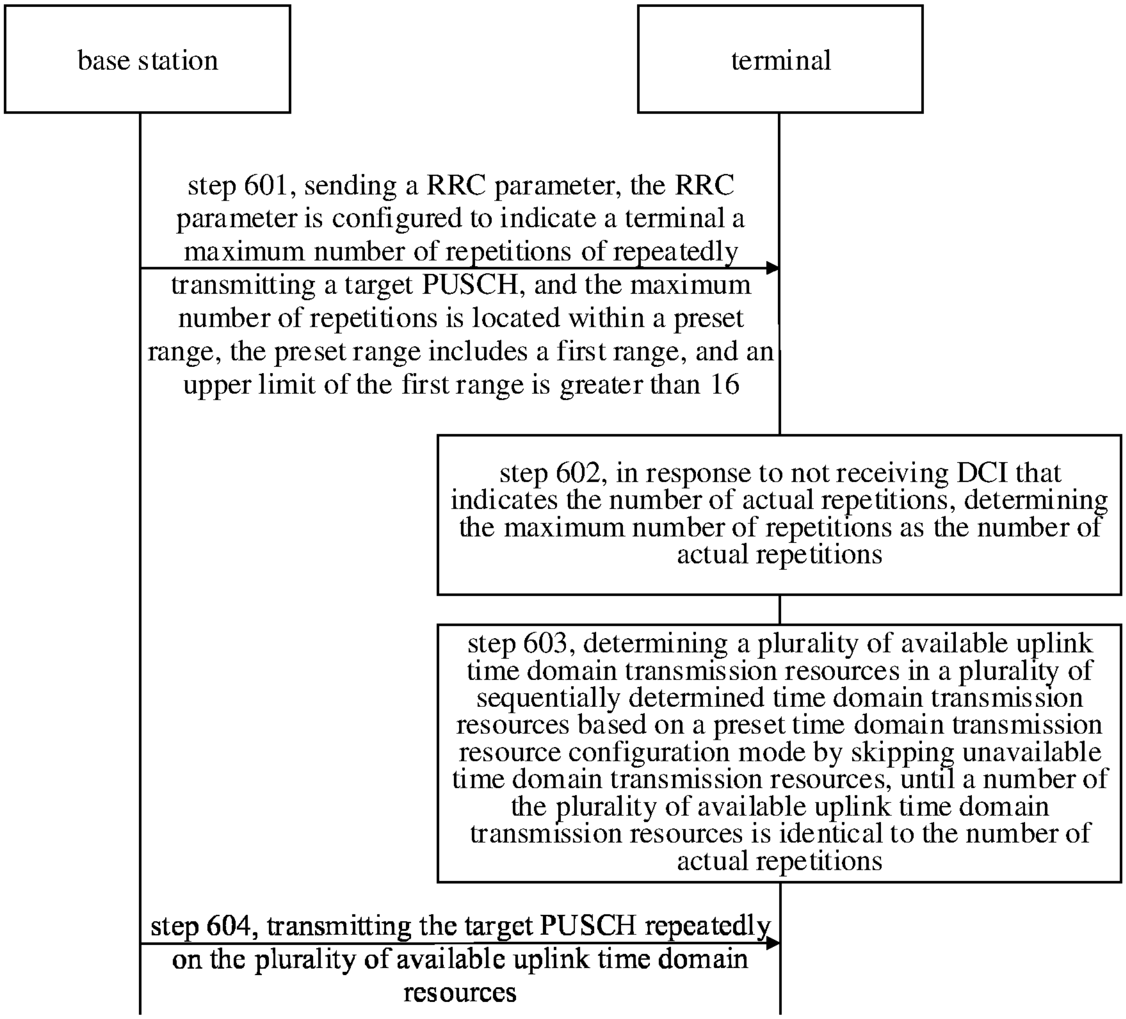

FIG. 6 base station terminal step 701, sending a RRC parameter, in which the RRC parameter is configured to indicate a terminal a maximum number of repetitions of repeatedly transmitting a target PUSCH, the maximum number of repetitions is located within a preset range, the preset range includes a first range, and an upper limit of the first range is greater than 16 step 702, sending first DCI to the terminal step 703, determining the number of actual repetitions indicated by the first DCI in a first TDRA table corresponding to the first range step 704, determining a plurality of available uplink time domain transmission resources in a plurality of sequentially determined time domain transmission resources based on a preset time domain transmission resource configuration mode by skipping unavailable time domain transmission resources, until a number of the plurality of available uplink time domain transmission resources is identical to the number of actual repetitions step 705, transmitting the target PUSCH repeatedly on the plurality of available uplink time domain resources

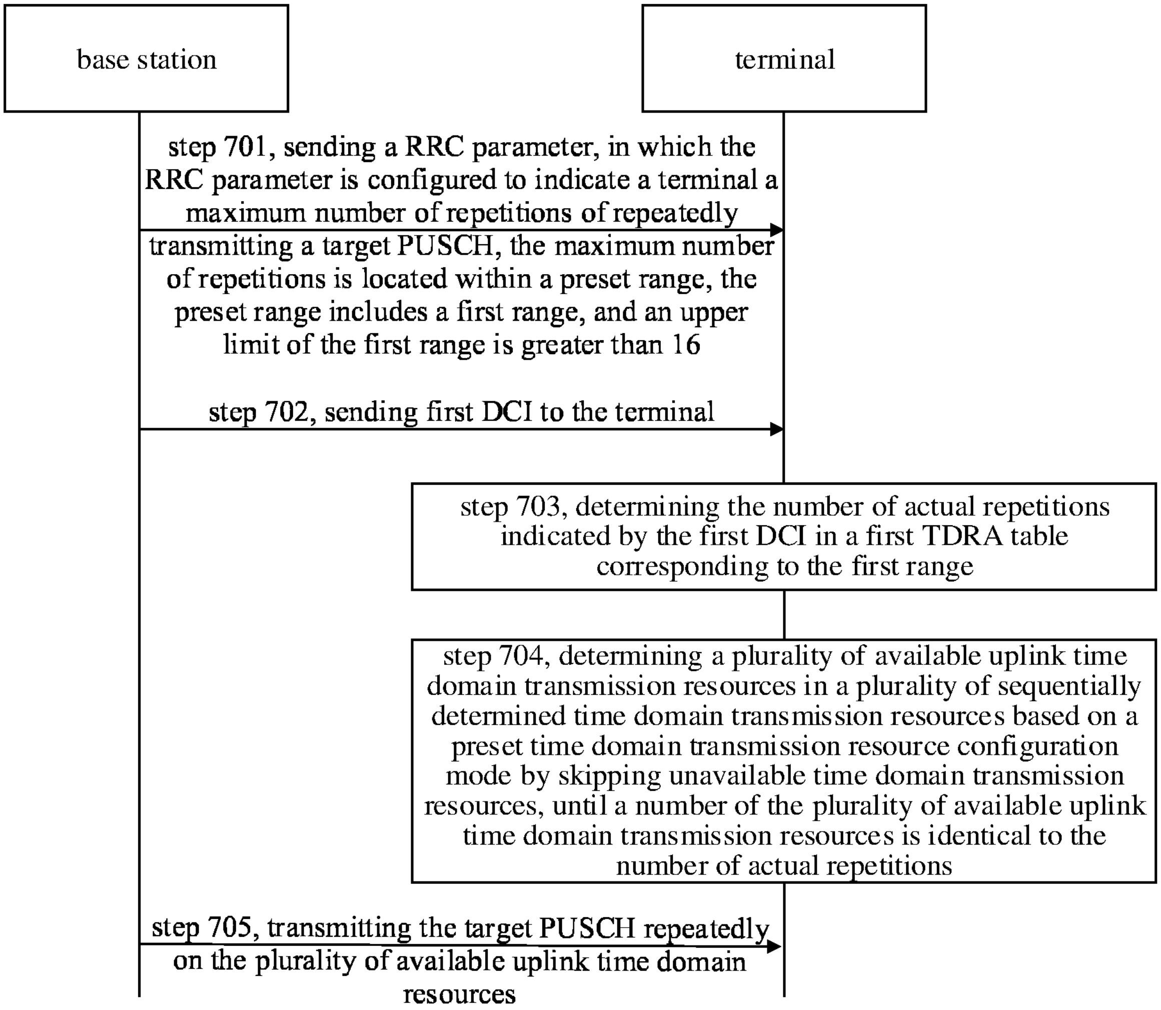

FIG. 7 sending a RRC parameter, in which the RRC parameter is configured to indicate a terminal a maximum number of repetitions of repeatedly transmitting a target PUSCH, the maximum number of repetitions is located within a preset range, the preset range at least includes a second range and a third range, and an upper limit of the second range is 16, and a lower limit of the third range is 17

1101

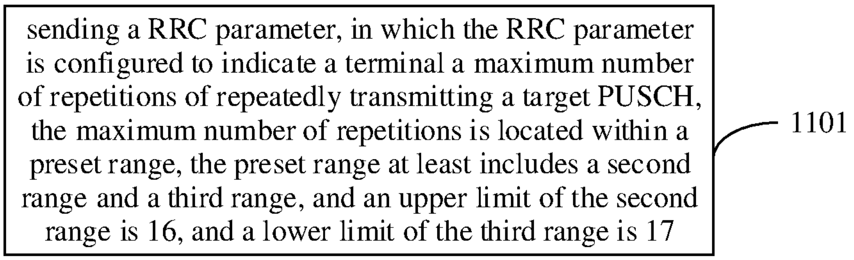

FIG. 11

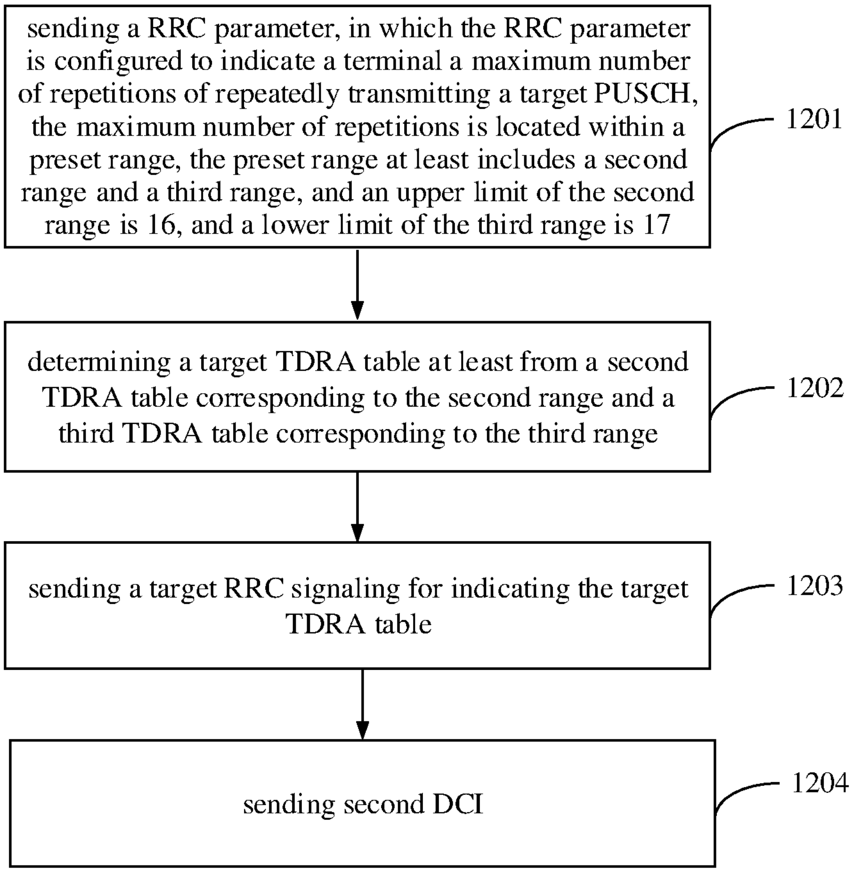

FIG. 12 base station terminal step 1401, sending a RRC parameter, in which the RRC parameter is configured to indicate a terminal a maximum number of repetitions of repeatedly transmitting a target PUSCH, the maximum number of repetitions is located within a preset range, the preset range at least includes a second range and a third range, and an upper limit of the second range is 16, and a lower limit of the third range is 17 step 1402, determining a target TDRA table at least from a second TDRA table corresponding to the second range and a third TDRA table corresponding to the third range step 1403, sending a target RRC signaling for indicating the target TDRA table step 1404, sending second DCI step 1405, determining a number of actual repetitions indicated by second DCI in the target TDRA table step 1406, determining a plurality of available uplink time domain transmission resources in a plurality of sequentially determined time domain transmission resources based on a preset time domain transmission resource configuration mode by skipping unavailable time domain transmission resources, until a number of the plurality of available uplink time domain transmission resources is identical to the number of actual repetitions step 1407, transmitting the target PUSCH repeatedly on the plurality of available uplink time domain resources

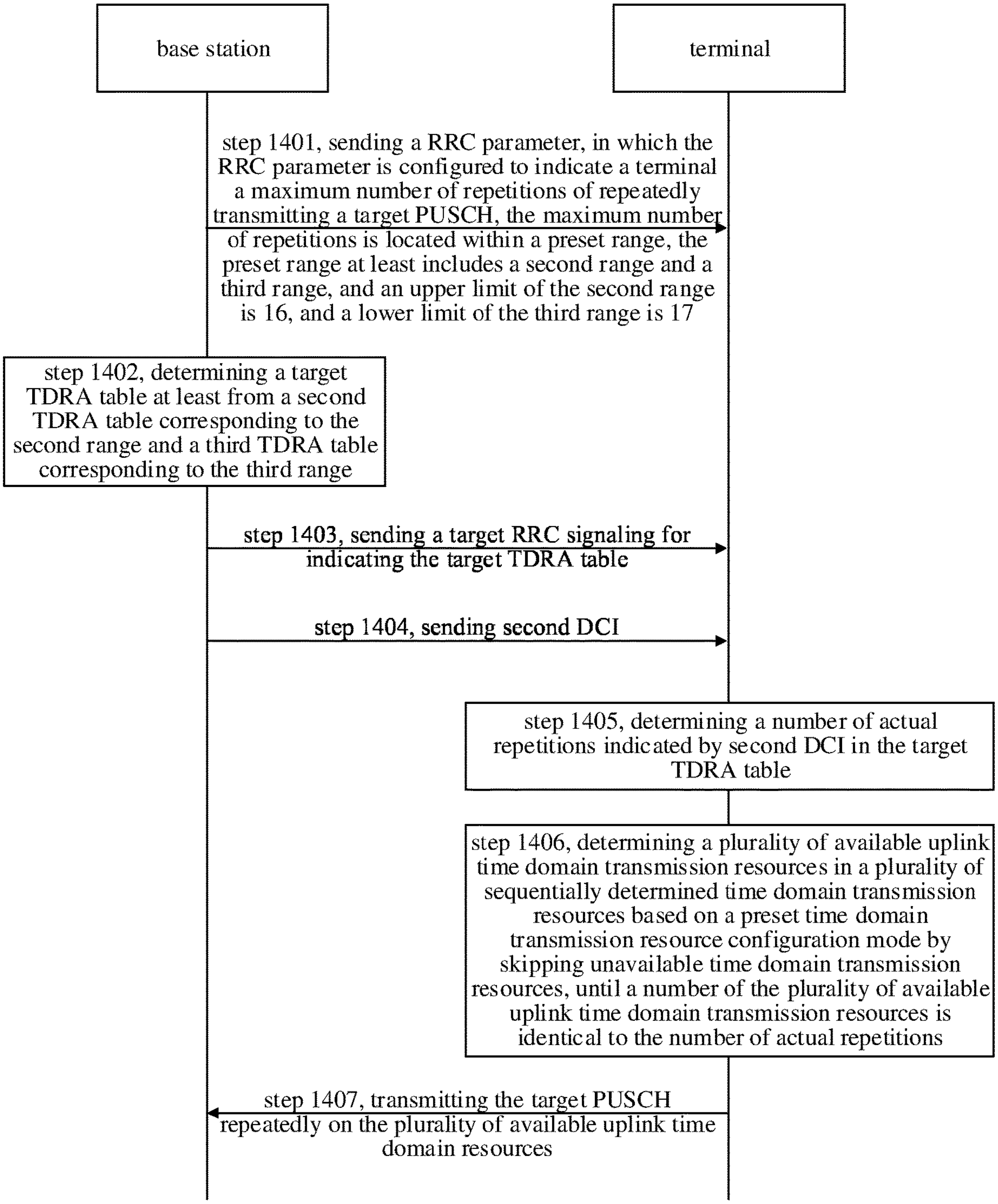

2302
processing component
2320
processor
2304
memory
2306
power component
2308
multimedia component
2310
audio component
2318
communication component
2316
sensor component
2312
Input/output interface

CHANNEL TRANSMISSION METHOD AND DEVICE, AND STORAGE MEDIUM

CROSS-REFERENCE TO RELATED APPLICATION

This application is a U.S. national phase of International Application No. PCT/CN2021/077979, filed on Feb. 25, 2021, the entire content of which is incorporated herein by reference.

TECHNICAL FIELD

The disclosure relates to a communication field, in particular to a channel transmission method, a channel transmission apparatus, and a storage medium.

BACKGROUND

In order to improve an uplink coverage, a terminal can repeatedly transmit a physical uplink shared channel (PUSCH), and a base station can combine received multiple repeated PUSCH signals to obtain a higher signal-to-noise ratio. Currently, the base station supports semi-static or dynamic indication of a number K of nominal repetitions. The terminal can repeatedly transmit the PUSCH in K consecutive slots.

SUMMARY

According to a first aspect of the embodiments of the disclosure, a channel transmission method, performed by a terminal, is provided. The method includes:

determining a maximum number of repetitions of repeatedly transmitting a target physical uplink shared channel (PUSCH), the maximum number of repetitions being located within a preset range;

determining a number of actual repetitions based on the maximum number of repetitions;

determining a plurality of available uplink time domain transmission resources for repeatedly transmitting the target PUSCH based on the number of actual repetitions; and transmitting the target PUSCH repeatedly on the plurality of available uplink time domain resources.

According to a second aspect of the embodiments of the disclosure, a channel transmission method, performed by a base station, is provided. The method includes:

sending a RRC parameter, in which the RRC parameter is configured to indicate a terminal a maximum number of repetitions of repeatedly transmitting a target PUSCH, and the maximum number of repetitions is located within a preset range.

According to a third aspect of the embodiments of the disclosure, a channel transmission method, performed by a terminal, is provided. The method includes:

determining a maximum number of repetitions of repeatedly transmitting a target PUSCH;

in response to triggering a preset configuration rule, determining an expanded number of actual repetitions based on the maximum number of repetitions and the preset configuration rule, in which the preset configuration rule is configured to expand a number of actual repetitions of repeatedly transmitting the target PUSCH;

determining a plurality of available uplink time domain transmission resources for repeatedly transmitting the target PUSCH based on the expanded number of actual repetitions; and transmitting the target PUSCH repeatedly on the plurality of available uplink time domain transmission resources.

According to a fourth aspect of the embodiments of the disclosure, a channel transmission method, performed by a base station, is provided. The method includes:

in response to a need to trigger a preset configuration rule, sending a target RRC parameter or a target signaling for triggering the preset configuration rule, in which the preset configuration rule is configured for a terminal to expand a number of actual repetitions of repeatedly transmitting a target PUSCH.

According to a fifth aspect of the embodiments of the disclosure, a channel transmission device is provided. The channel transmission device includes:

a processor;

a memory for storing instructions executable by the processor; in which the processor is configured to implement the channel transmission method according to the first aspect or the third aspect.

According to a sixth aspect of the embodiments of the disclosure, a channel transmission device is provided. The channel transmission device includes:

a processor;

a memory for storing instructions executable by the processor; in which the processor is configured to implement the channel transmission method according to the second aspect or the fourth aspect.

It should be understood that the above general description and the following detailed descriptions are exemplary and explanatory only and do not limit the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

FIG. 6 is a flowchart of a channel transmission method according to an exemplary embodiment.

FIG. 7 is a flowchart of a channel transmission method according to an exemplary embodiment.

FIG. 11 is a flowchart of a channel transmission method according to an exemplary embodiment.

FIG. 12 is a flowchart of a channel transmission method according to an exemplary embodiment.

FIG. 14 is a flowchart of a channel transmission method according to an exemplary embodiment.

DETAILED DESCRIPTION

Figure 1:
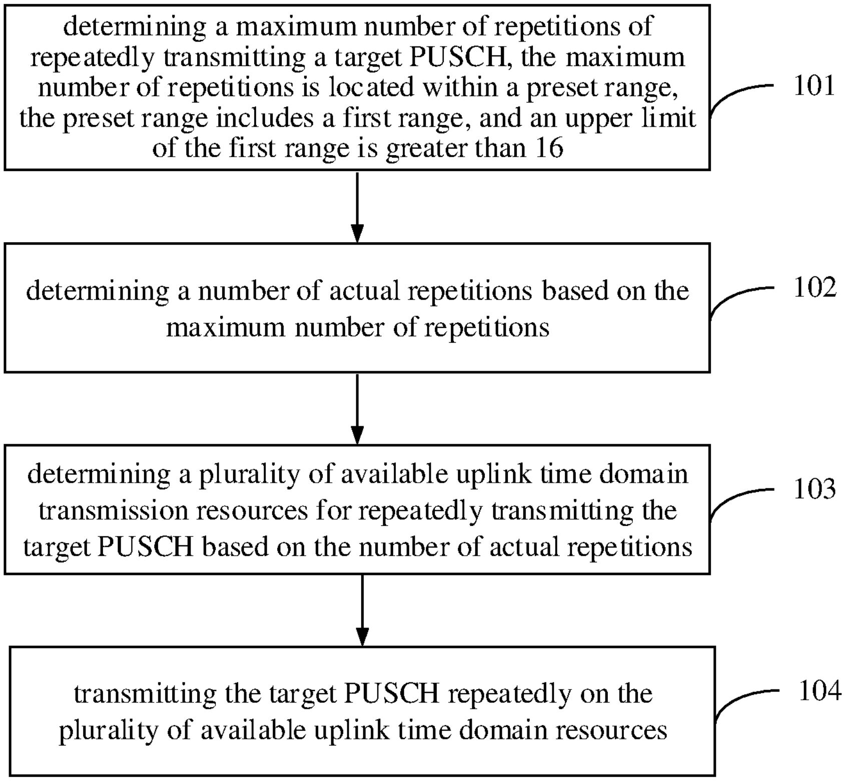
FIG. 1 is a flowchart of a channel transmission method according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It is understandable that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

The existing PUSCH repetition type A solution can be nominally configured with a maximum number of repetitions of 16. However, for some time division duplex (TDD) systems configured with more downlink slots, for example, in some time division duplex (TDD) configuration scenarios, when a ratio of a number of slots used for downlink data transmission to a number of slots used for uplink data transmission is 7:3, and the maximum number of repetitions in physical uplink shared channel (PUSCH) repetition is 16, a number of actual repetitions of the PUSCH can only reach 4.8. Due to a large amount of unavailable transmission resources, PUSCH repetition may be canceled, and the number of actual repetitions is much less than the nominally configured number K of repetitions, which severely degrades an uplink coverage performance.

For urban 4 GHz (Gigahertz) TDD, when an inter Scell distance (ISD) is set to 400 meters, about 8 dB (gain) performance gap may be compensated. It is found by simulation that at least 16 actual repetitions are required to satisfy the PUSCH coverage requirements. When the ISD is extended to 500 meters, a performance gap of 10 db may be compensated.

Obviously, in the case where the maximum number of repetitions agreed in the current specifications is 16, the number of actual repetitions for repeatedly transmitting the PUSCH actually cannot satisfy the uplink coverage requirements.

To address this problem, the disclosure provides the following channel transmission solutions.

In a first solution, it supports and enables increasing an upper limit of a range to which the maximum number of repetitions belongs by default, and modifies a counting mode of counting the number of actual repetitions.

The first solution is described below on a terminal side.

As illustrated in FIG. 1, FIG. 1 is a flowchart of a channel transmission method according to an embodiment. The method is performed by a terminal. The method includes the following steps.

At step 101, a maximum number of repetitions of repeatedly transmitting a target PUSCH is determined, the maximum number of repetitions is located within a preset range. The preset range includes a first range, and an upper limit of the first range is greater than 16.

In the embodiment of the disclosure, the upper limit of the first range may be a positive integer greater than 16, including but not limited to 32, 64, or 128. Correspondingly, the first range includes: [1, 32], [1, 64], or [1, 128], etc.

A base station determines the maximum number of repetitions of repeatedly transmitting the target PUSCH within the above-mentioned first range for the terminal, and sends the configured maximum number of repetitions to the terminal based on a radio resource control (RRC) parameter. The terminal determines, based on the RRC parameter, the maximum number of repetitions of repeatedly transmitting the target PUSCH configured by the base station. The RRC parameter includes, but is not limited to, pusch-AggregationFactor (i.e., a PUSCH aggregation parameter).

At step 102, a number of actual repetitions is determined based on the maximum number of repetitions.

In the embodiment of the disclosure, the number of actual repetitions is less than or equal to the maximum number of repetitions.

At step 103, a plurality of available uplink time domain transmission resources for repeatedly transmitting the target PUSCH are determined based on the number of actual repetitions.

In the related art, when counting the number of actual repetitions of the PUSCH, even if a time domain transmission resource is unavailable, it is still counted as an actual repetition of the PUSCH. In the embodiment of the disclosure, the counting mode of counting the number of actual repetitions may be modified to determine only the plurality of available uplink time domain transmission resources that can be used to repeatedly transmit the target PUSCH.

In the embodiment of the disclosure, the terminal may determine the plurality of available uplink time domain transmission resources in a plurality of sequentially determined time domain transmission resources based on a preset time domain transmission resource configuration mode by skipping unavailable time domain transmission resources, until a number of the plurality of available uplink time domain transmission resources is identical to the number of actual repetitions. The unavailable time domain transmission resources include, but are not limited to, downlink time domain transmission resources. The preset time domain transmission resource configuration mode includes, but is not limited to, indicating transmission modes corresponding to the plurality of time domain transmission resources respectively.

For example, in 10 time domain transmission resources sequentially determined, according to an indication of the preset time domain transmission resource configuration mode, the first 8 time domain transmission resources are used for transmitting downlink data and belong to the unavailable time domain transmission resources that need to be skipped. The terminal determines 2 time domain transmission resources that are used for transmitting uplink data as the available uplink time domain transmission resources until the number of determined available uplink time domain transmission resources is identical to the number of actual repetitions.

At step 104, the target PUSCH is transmitted repeatedly on the plurality of available uplink time domain resources.

In the embodiment, the maximum number of repetitions is located within the first range, and the upper limit of the first range is greater than 16. The terminal determines the number of actual repetitions based on the maximum number of repetitions located within the first range, and determines the plurality of available uplink time domain transmission resources based on the number of actual repetitions. Thus the terminal can transmit the target PUSCH repeatedly on the plurality of available uplink time domain resources, which increases the number of actual repetitions of repeatedly transmitting the PUSCH, and improves the uplink coverage performance.

Figure 2:
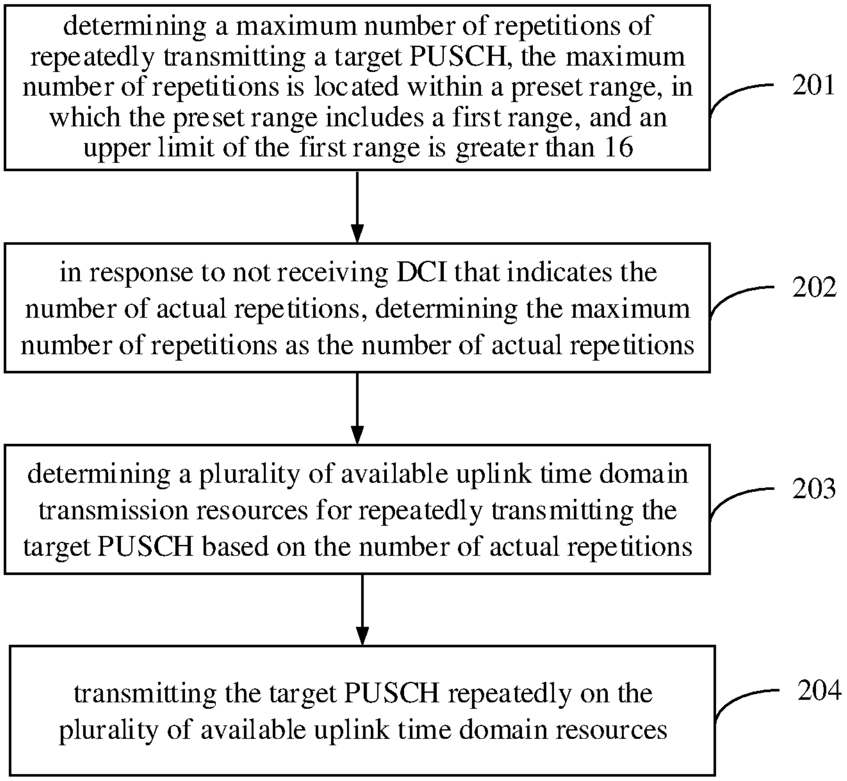
FIG. 2 is a flowchart of a channel transmission method according to an exemplary embodiment.

As illustrated in FIG. 2, FIG. 2 is a flowchart of a channel transmission method according to an embodiment. The method is performed by a terminal. The method may include the following steps.

At step 201, a maximum number of repetitions of repeatedly transmitting a target PUSCH is determined, the maximum number of repetitions is located within a preset range. The preset range includes a first range, and an upper limit of the first range is greater than 16.

In the embodiment of the disclosure, the upper limit of the first range may be a positive integer greater than 16, including but not limited to 32, 64, or 128. Correspondingly, the first range includes: [1, 32], [1, 64], or [1, 128].

A base station determines the maximum number of repetitions of repeatedly transmitting the target PUSCH within the above-mentioned first range for the terminal, and sends the configured maximum number of repetitions to the terminal based on a RRC parameter. The terminal determines the maximum number of repetitions of repeatedly transmitting the target PUSCH configured by the base station. The RRC parameter includes, but is not limited to, pusch-AggregationFactor (a PUSCH aggregation parameter).

At step 202, in response to not receiving downlink control information (DCI) that indicates the number of actual repetitions, the maximum number of repetitions is determined as the number of actual repetitions.

In the embodiment of the disclosure, if the terminal does not receive the above DCI, it directly determines the maximum number of repetitions as the number of actual repetitions. For example, if the maximum number of repetitions is 32, the number of actual repetitions is 32.

At step 203, a plurality of available uplink time domain transmission resources for repeatedly transmitting the target PUSCH are determined based on the number of actual repetitions.

In the embodiment of the disclosure, determining the plurality of available uplink time domain transmission resources is executed in the same manner as described above for step 103, and will not be repeated herein.

At step 204, the target PUSCH is transmitted repeatedly on the plurality of available uplink time domain resources.

In the embodiment, the terminal may determine the maximum number of repetitions that is located within the first range and configured by the base station as the number of actual repetitions, and further determine the plurality of available uplink time domain transmission resources. The terminal transmits the target PUSCH repeatedly on the plurality of available uplink time domain transmission resources, which increases the number of actual repetitions of repeatedly transmitting the PUSCH, and improves the uplink coverage performance.

Figure 3:
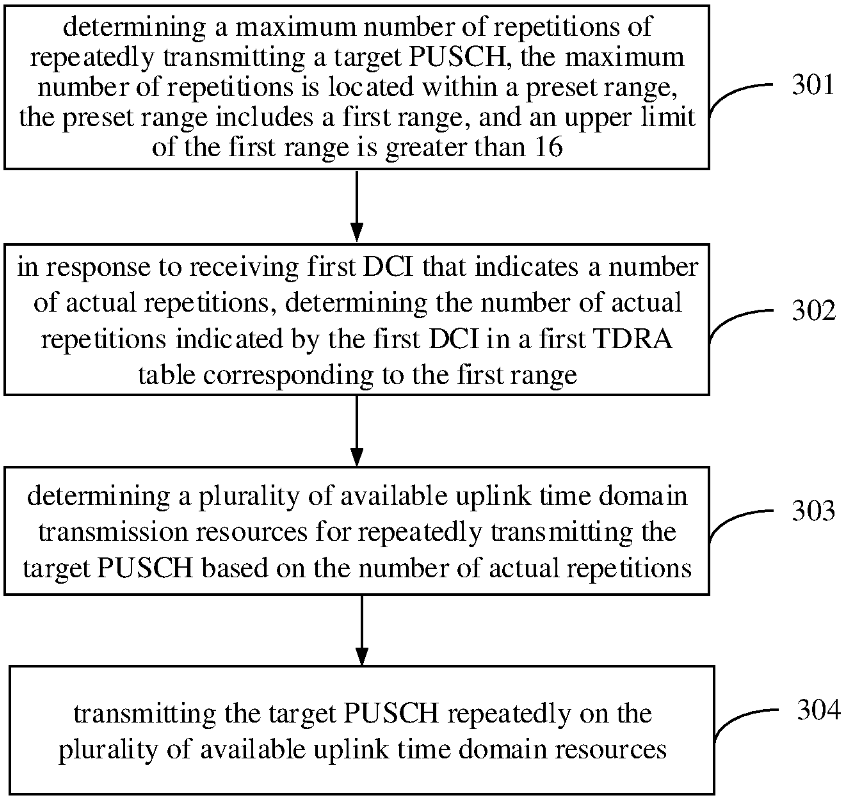
FIG. 3 is a flowchart of a channel transmission method according to an exemplary embodiment.

As illustrated in FIG. 3, FIG. 3 is a flowchart of a channel transmission method according to an embodiment. The method may include the following steps.

At step 301, a maximum number of repetitions of repeatedly transmitting a target PUSCH is determined, the maximum number of repetitions being located within a preset range. The preset range includes a first range, and an upper limit of the first range is greater than 16.

In the embodiment of the disclosure, the upper limit of the first range may be a positive integer greater than 16, including but not limited to 32, 64, or 128. Correspondingly, the first range includes: [1, 32], [1, 64], or [1, 128].

A base station determines the maximum number of repetitions of repeatedly transmitting the target PUSCH within the above-mentioned first range for the terminal, and sends the configured maximum number of repetitions to the terminal based on a RRC parameter. The terminal determines the maximum number of repetitions of repeatedly transmitting the target PUSCH configured by the base station. The RRC parameter includes, but is not limited to, pusch-AggregationFactor (a PUSCH aggregation parameter).

At step 302, in response to receiving first DCI that indicates a number of actual repetitions, the number of actual repetitions indicated by the first DCI is determined in a first TDRA table corresponding to the first range.

In the related art, a time domain resource allocation (TDRA) table at least includes a table entry related to a number of repetitions of PUSCH, each row of the TDRA table corresponds to a different number of repetitions of PUSCH, and the number of rows in the TDRA table is the same as an upper limit of the maximum number of repetitions specified in the specification. That is, if the maximum number of repetitions specified in the current specification is 16, the corresponding TDRA table has 16 rows, and each row includes at least one number of repetitions of PUSCH.

After the base station sends the maximum number of repetitions to the terminal, it can indicate a row in the TDRA table through the DCI, and the terminal determines the number of repetitions of PUSCH corresponding to that row in the TDRA table as the number of actual repetitions according to the indication of the DCI. The number of actual repetitions is less than or equal to the maximum number of repetitions configured by the base station.

For example, the base station configures that the maximum number of repetitions for the terminal to repeatedly transmit the target PUSCH is 10 based on the RRC parameter, and the number of actual repetitions indicated by the DCI subsequently is less than or equal to 10.

In the embodiment of the disclosure, since the upper limit of the maximum number of repetitions is increased, the original TDRA table specified in the specification may be expanded correspondingly by increasing the number of rows in the TDRA table, to obtain the first TDRA table corresponding to the first range. For example, if the upper limit of the maximum number of repetitions is 32, the first TDRA table may include 32 rows, each row corresponding to a different number of repetitions of PUSCH.

After receiving the first DCI, the terminal determines a row indicated by the first DCI in the first TDRA, and determines the number of repetitions of PUSCH included in the row as the number of actual repetitions.

In the embodiment of the disclosure, a number of bits occupied by an information field in the first DCI used to indicate the number of actual repetitions may also be expanded to be greater than a preset number. The preset number is the number of bits occupied by the information field in the DCI as specified in existing specification. For example, if an upper limit of the maximum number of repetitions specified in the existing specification is 16, the information field used to indicate the number of actual repetitions in the DCI needs to occupy 5 bits, so the preset number is 5, and the number of bits occupied by the information field in the first DCI in the disclosure is greater than 5.

At step 303, a plurality of available uplink time domain transmission resources for repeatedly transmitting the target PUSCH are determined based on the number of actual repetitions.

In the embodiment of the disclosure, determining the plurality of available uplink time domain transmission resources is executed in the same manner as described above for step 103, and will not be repeated herein.

At step 304, the target PUSCH is transmitted repeatedly on the plurality of available uplink time domain resources.

In the embodiment, after the terminal determines the maximum number of repetitions, it can determine the number of actual repetitions of repeatedly transmitting the target PUSCH in the expanded first TDRA table according to the indication of the DCI, which increases the number of actual repetitions of repeatedly transmitting the PUSCH, and improves the uplink coverage performance.

Figure 4:
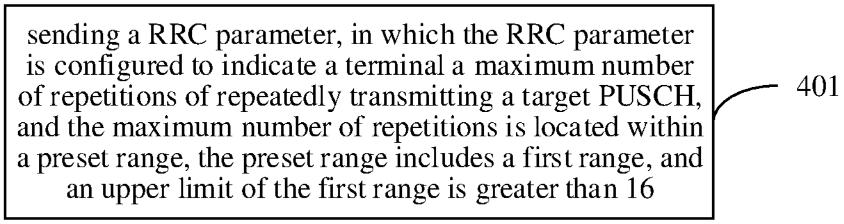
FIG. 4 is a flowchart of a channel transmission method according to an exemplary embodiment.

The first channel transmission solution will be described below from a base station side. As illustrated in FIG. 4, FIG. 4 is a flowchart of a channel transmission method according to an embodiment. The method is performed by a base station. The method includes the following steps.

At step 401, a RRC parameter is sent, in which the RRC parameter is configured to indicate a terminal a maximum number of repetitions of repeatedly transmitting a target PUSCH, and the maximum number of repetitions is located within a preset range. The preset range includes a first range, and an upper limit of the first range is greater than 16.

In the embodiment of the disclosure, the base station may configure the maximum number of repetitions of repeatedly transmitting the target PUSCH within the first range for the terminal, and send the configured maximum number of repetitions to the terminal via the RRC parameter. The RRC parameter includes, but is not limited to, pusch-AggregationFactor.

In the above embodiment, the base station may send the maximum number of repetitions located within the first range to the terminal via the RRC parameter, and the terminal may directly determine the maximum number of repetitions as a number of actual repetitions in a case of not receiving DCI indicating the number of actual repetitions, which increases the number of actual repetitions of repeatedly transmitting the PUSCH, and improves the uplink coverage performance.

Figure 5:
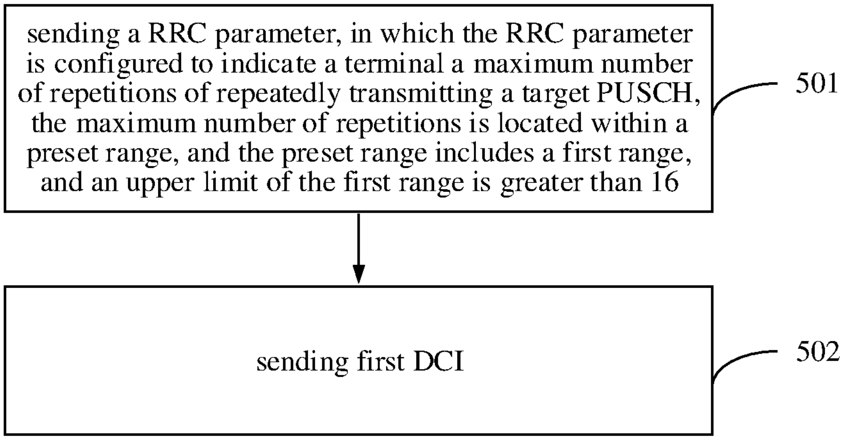
FIG. 5 is a flowchart of a channel transmission method according to an exemplary embodiment.

As illustrated in FIG. 5, FIG. 5 is a flowchart of a channel transmission method according to an embodiment. The method is performed by a base station. The method may include the following steps.

At step 501, a RRC parameter is sent, in which the RRC parameter is configured to indicate a terminal a maximum number of repetitions of repeatedly transmitting a target PUSCH, and the maximum number of repetitions is located within a preset range. The preset range includes a first range, and an upper limit of the first range is greater than 16.

At step 502, first DCI is sent.

In the embodiment of the disclosure, the first DCI is configured to indicate the terminal to determine a number of actual repetitions of repeatedly transmitting the target PUSCH in a first TDRA table corresponding to the first range. A number of rows in the first TDRA table is identical to an upper limit of the maximum number of repetitions. A number of bits occupied by an information field in the first DCI for indicating the number of actual repetitions is greater than a preset number.

In the above embodiment, in addition to sending the RRC parameter for indicating the terminal the maximum number of repetitions of repeatedly transmitting the target PUSCH, the base station may also dynamically select the number of actual repetitions of repeatedly transmitting the target PUSCH in the first TDRA table based on the first DCI, which increases the number of actual repetitions of repeatedly transmitting the PUSCH, and improves the uplink coverage performance.

In some optional embodiments, as illustrated in FIG. 6, FIG. 6 is a flowchart of a channel transmission method according to an embodiment. The method includes the following steps.

At step 601, a base station sends a RRC parameter, the RRC parameter is configured to indicate a terminal a maximum number of repetitions of repeatedly transmitting a target PUSCH, and the maximum number of repetitions is located within a preset range. The preset range includes a first range, and an upper limit of the first range is greater than 16.

In the embodiment of the disclosure, for example, the upper limit of the first range is 32, and the base station determines the maximum number of repetitions within the first range as 32. The base station sends the maximum number of repetitions to the terminal via the RRC parameter. In practical use, the upper limit of the first range may be any positive integer greater than 16, including but not limited to 64 and 128, etc.

At step 602, in response to not receiving DCI that indicates a number of actual repetitions, the terminal determines the maximum number of repetitions as the number of actual repetitions.

In the embodiment of the disclosure, the maximum number of repetitions is 32, then the number of actual repetitions is also 32.

At step 603, the terminal determines a plurality of available uplink time domain transmission resources in a plurality of sequentially determined time domain transmission resources based on a preset time domain transmission resource configuration mode by skipping unavailable time domain transmission resources, until a number of the plurality of available uplink time domain transmission resources is identical to the number of actual repetitions.

In the embodiment of the disclosure, the unavailable time domain transmission resources include, but are not limited to, downlink time domain transmission resources, and determining the plurality of available uplink time domain transmission resources is executed in the same manner as described above for step 103, and will not be repeated herein.

At step 604, the terminal transmits the target PUSCH repeatedly on the plurality of available uplink time domain resources.

In the above embodiment, the upper limit of the range to which the maximum number of repetitions belongs is increased, and the counting mode for counting the number of actual repetitions is modified, thus the number of actual repetitions of repeatedly transmitting the PUSCH is increased, and the uplink coverage performance is improved.

In some optional embodiments, as illustrated in FIG. 7, FIG. 7 is a flowchart of a channel transmission method according to an embodiment. The method may include the following steps.

At step 701, a base station sends a RRC parameter, in which the RRC parameter is configured to indicate a terminal a maximum number of repetitions of repeatedly transmitting a target PUSCH, and the maximum number of repetitions is located within a preset range. The preset range includes a first range, and an upper limit of the first range is greater than 16.

In the embodiment of the disclosure, for example, the upper limit of the first range is 32, and the base station determines the maximum number of repetitions within the first range as 32. The base station sends the maximum number of repetitions to the terminal via the RRC parameter.

At step 702, the base station sends first DCI to the terminal.

A number of bits occupied by an information field in the first DCI for indicating a number of actual repetitions is greater than a preset number.

At step 703, the terminal determines the number of actual repetitions indicated by the first DCI in a first TDRA table corresponding to the first range.

In the embodiment of the disclosure, a number of rows in the first TDRA table is 32.

At step 704, the terminal determines a plurality of available uplink time domain transmission resources in a plurality of sequentially determined time domain transmission resources based on a preset time domain transmission resource configuration mode by skipping unavailable time domain transmission resources, until a number of the plurality of available uplink time domain transmission resources is identical to the number of actual repetitions.

In the embodiment of the disclosure, the unavailable time domain transmission resources include, but are not limited to, downlink time domain transmission resources, and determining the plurality of available uplink time domain transmission resources is executed in the same manner as described above for step 103, and will not be repeated herein.

At step 705, the terminal transmits the target PUSCH repeatedly on the plurality of available uplink time domain resources.

In the above embodiment, the upper limit of the range to which the maximum number of repetitions belongs is increased, and the counting mode for counting the number of actual repetitions is modified, thus the number of actual repetitions of repeatedly transmitting the PUSCH is increased, and the uplink coverage performance is improved.

In addition to the above-mentioned first channel transmission solution, the disclosure also provides another channel transmission solution, which is provided as follows.

In a second solution, a counting mode for counting the number of actual repetitions is modified, and at least two TDRA tables are maintained in the specification.

The second solution will be introduced below from the terminal side first.

Figure 8:
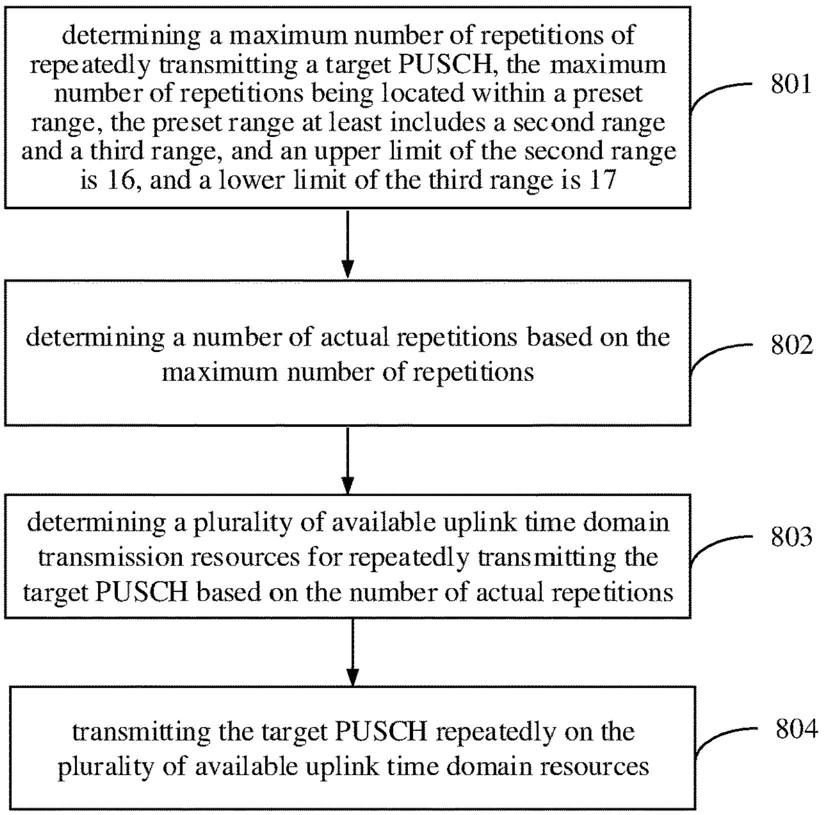
FIG. 8 is a flowchart of a channel transmission method according to an exemplary embodiment.

As illustrated in FIG. 8, FIG. 8 is a flowchart of a channel transmission method according to an embodiment. The method is performed by a terminal. The method includes the following steps.

At step 801, a maximum number of repetitions of repeatedly transmitting a target PUSCH is determined, the maximum number of repetitions being located within a preset range. The preset range at least includes a second range and a third range, and an upper limit of the second range is 16, and a lower limit of the third range is 17.

In the embodiment of the disclosure, an upper limit of the maximum number of repetitions of repeatedly transmitting the PUSCH in the specification may also be modified. The second range may be [1, 16], and the third range may be [17, N], N being a positive integer greater than 17. In order to correspond to the second range, N may be 32. In practical use, the preset range may further includes at least a fourth range, e.g., [33, 48], which is not limited in the disclosure.

The maximum number of repetitions configured by a base station for the terminal via the RRC parameter can be less than 16 or greater than 16 while less than the upper limit of the third range, i.e., it can be located within the second range or within the third range.

At step 802, a number of actual repetitions is determined based on the maximum number of repetitions.

In the embodiment of the disclosure, the number of actual repetitions is less than or equal to the maximum number of repetitions.

At step 803, a plurality of available uplink time domain transmission resources for repeatedly transmitting the target PUSCH are determined based on the number of actual repetitions.

At step 804, the target PUSCH is transmitted repeatedly on the plurality of available uplink time domain resources.

In the above embodiment, the maximum number of repetitions is located within the preset range, the preset range at least includes the second range and the third range. The terminal determines the number of actual repetitions based on the maximum number of repetitions, and determines the plurality of available uplink time domain transmission resources based on the number of actual repetitions. Thus the terminal transmits the target PUSCH repeatedly on the plurality of available uplink time domain resources, which increases the number of actual repetitions of repeatedly transmitting the PUSCH, and improves the uplink coverage performance.

Figure 9:
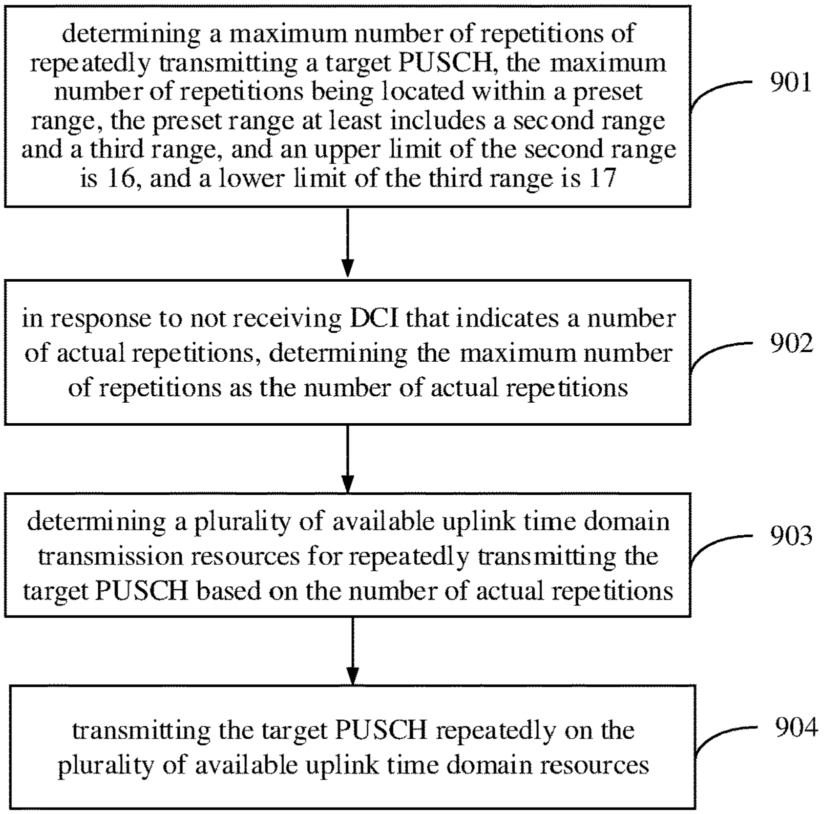
FIG. 9 is a flowchart of a channel transmission method according to an exemplary embodiment.

As illustrated in FIG. 9, FIG. 9 is a flowchart of a channel transmission method according to an embodiment. The method is performed by a terminal. The method includes the following steps.

At step 901, a maximum number of repetitions of repeatedly transmitting a target PUSCH is determined, the maximum number of repetitions being located within a preset range. The preset range at least includes a second range and a third range, and an upper limit of the second range is 16, and a lower limit of the third range is 17.

At step 902, in response to not receiving DCI that indicates a number of actual repetitions, the maximum number of repetitions is determined as the number of actual repetitions.

At step 903, a plurality of available uplink time domain transmission resources for repeatedly transmitting the target PUSCH are determined based on the number of actual repetitions.

In the embodiment of the disclosure, determining the plurality of available uplink time domain transmission resources is executed in the same manner as described above for step 103, and will not be repeated herein.

At step 904, the target PUSCH is transmitted repeatedly on the plurality of available uplink time domain resources.

In the above embodiment, the terminal may determine the maximum number of repetitions configured by a base station as the number of actual repetitions, and determine the plurality of available uplink time domain transmission resources. Thus the terminal transmits the target PUSCH repeatedly on the plurality of available uplink time domain transmission resources, which increases the number of actual repetitions of repeatedly transmitting the PUSCH, and improves the uplink coverage performance.

Figure 10:
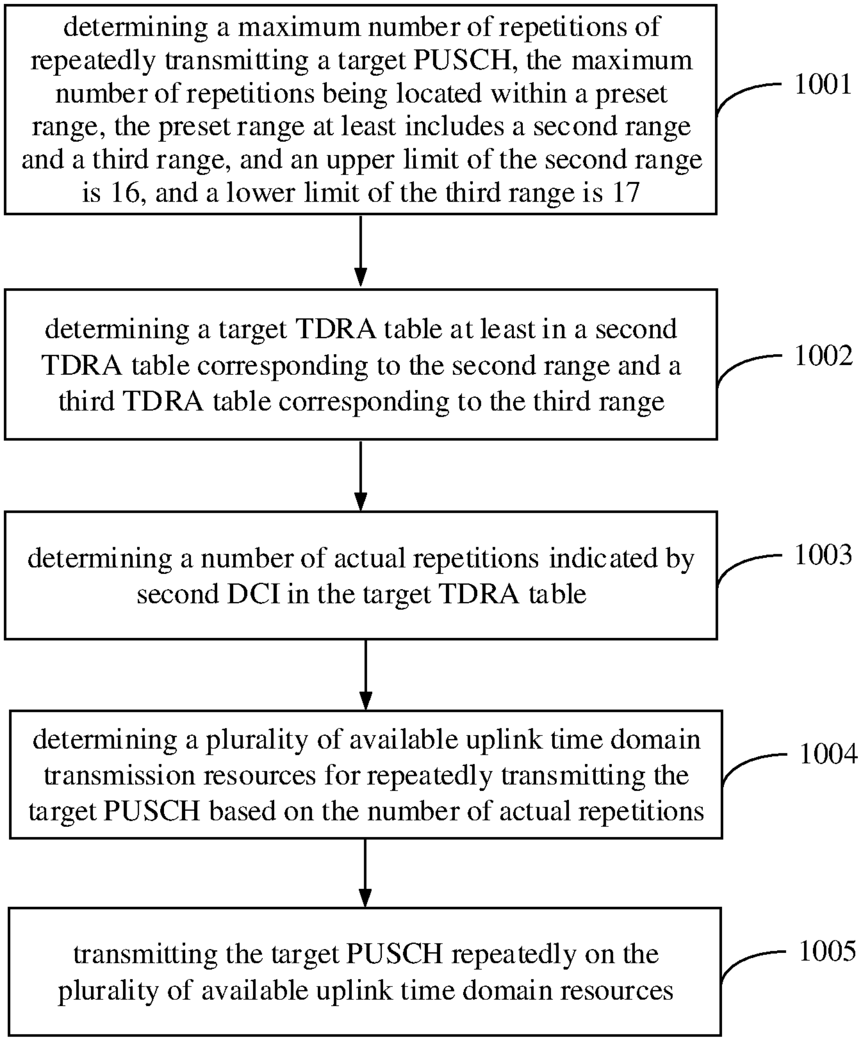
FIG. 10 is a flowchart of a channel transmission method according to an exemplary embodiment.

As illustrated in FIG. 10, FIG. 10 is a flowchart of a channel transmission method according to an embodiment. The method is performed by a terminal. The method includes the following steps.

At step 1001, a maximum number of repetitions of repeatedly transmitting a target PUSCH is determined, the maximum number of repetitions being located within a preset range. The preset range at least includes a second range and a third range, and an upper limit of the second range is 16, and a lower limit of the third range is 17.

At step 1002, a target TDRA table is determined at least from a second TDRA table corresponding to the second range and a third TDRA table corresponding to the third range.

In the embodiment of the disclosure, the second TDRA table corresponding to the second range may be a TDRA table agreed in the existing specification, and a maximum value of the number of repetitions of PUSCH included in the second TDRA table is 16. The third TDRA table corresponding to the third range may be a newly added TDRA table, which may also include 16 rows corresponding to the second TDRA table, each row indicates a different number of repetitions of PUSCH. A lower limit of the number of repetitions of PUSCH indicated by the third TDRA table is 17, and an upper limit of the number of repetitions of PUSCH indicated by the third TDRA table is 32.

The terminal may determine the target TDRA table at least from the second TDRA table and the third TDRA table based on an indication of a received target RRC signaling.

At step 1003, a number of actual repetitions indicated by second DCI is determined in the target TDRA table.

In the embodiment of the disclosure, the second DCI may indicate a numbering of a row in which the number of actual repetitions is located in the target TDRA table, and the terminal determines the number of actual repetitions in the target TDRA table based on the indication of the second DCI.

For example, if the target TDRA table is the second TDRA table and the numbering of the row indicated by the second DCI is 16, the number of actual repetitions is 16. If the target TDRA table is the third TDRA table and the numbering of the row indicated by the second DCI is 16, the number of actual repetitions is 32. Similarly, the same approach can be used to determine the number of actual repetitions if the number of TDRA tables agreed to be maintained by the specification is greater than 2 in this scenario.

It is noted that if the number of rows in the third TDRA table does not exceed 16, a number of bits occupied by the information field in the second DCI for indicating the number of actual repetitions is a preset number. The preset number is a number of bits occupied by the information field in the DCI as specified in the existing specification.

At step 1004, a plurality of available uplink time domain transmission resources for repeatedly transmitting the target PUSCH are determined based on the number of actual repetitions.

In the embodiment of the disclosure, determining the plurality of available uplink time domain transmission resources is executed in the same manner as described above for step 103, and will not be repeated herein.

At step 1005, the target PUSCH is transmitted repeatedly on the plurality of available uplink time domain resources.

In the above embodiment, after determining the maximum number of repetitions, the terminal may determine the target TDRA table in at least two TDRA tables, and then determines the number of actual repetitions of repeatedly transmitting the target PUSCH in the target TDRA table based on the indication of the second DCI, which increases the number of actual repetitions of repeatedly transmitting the PUSCH, and improves the uplink coverage performance.

In some optional embodiments, the terminal may report first auxiliary information to a base station. The first auxiliary information is configured to assist the base station in determining the target TDRA table in the at least two TDRA tables, and the first auxiliary information includes, but is not limited to, a decoding performance of the terminal on previously received downlink data, and a measurement result of a reception quality of a downlink channel measured by the terminal.

The second channel transmission solution will be introduced from a base station side below. As illustrated in FIG. 11, FIG. 11 is a flowchart of a channel transmission method according to an embodiment. The method is performed by a base station. The method includes the following steps.

At step 1101, a RRC parameter is sent, in which the RRC parameter is configured to indicate a terminal a maximum number of repetitions of repeatedly transmitting a target PUSCH, and the maximum number of repetitions is located within a preset range. The preset range at least includes a second range and a third range, and an upper limit of the second range is 16, and a lower limit of the third range is 17.

In the embodiment of the disclosure, the preset range at least includes the second range and the third range, the maximum number of repetitions configured by the base station is located within the second range or the third range, or located within one of the other ranges included in the preset range. The base station can send the configured maximum number of repetitions to the terminal via the RRC parameter, which includes but is not limited to pusch-AggregationFactor.

In the above embodiment, the base station may send the maximum number of repetitions to the terminal via the RRC parameter, and the terminal may directly determine the maximum number of repetitions as a number of actual repetitions in response to not receiving the DCI that indicates the number of actual repetitions, which increases the number of actual repetitions of repeatedly transmitting the PUSCH, and improves the uplink coverage performance.

As illustrated in FIG. 12, FIG. 12 is a flowchart of a channel transmission method according to an embodiment. The method is performed by a base station. The method may include the following steps.

At step 1201, a RRC parameter is sent, in which the RRC parameter is configured to indicate a terminal a maximum number of repetitions of repeatedly transmitting a target PUSCH, and the maximum number of repetitions is located within a preset range. The preset range at least includes a second range and a third range, and an upper limit of the second range is 16, and a lower limit of the third range is 17.

At step 1202, a target TDRA table is determined at least from a second TDRA table corresponding to the second range and a third TDRA table corresponding to the third range.

In the embodiment of the disclosure, the base station may use any of the following methods to determine the target TDRA table, which is not limited herein.

In a possible implementation, the base station may determine the target TDRA table based on a network side coverage enhancement target. For example, based on the network side coverage enhancement target, if the maximum number of repetitions for the terminal to repeatedly transmit the target PUSCH is determined to be 16, the second TDRA table is selected as the target TDRA table. If the maximum number of repetitions for the terminal to repeatedly transmit the target PUSCH is determined to be 32, the third TDRA table is selected as the target TDRA table.

In another possible implementation, the base station may determine the target TDRA table based on a measurement result of measuring a reception quality of an uplink channel. For example, if the measurement result indicates that the maximum number of repetitions for the terminal to repeatedly transmit the target PUSCH is 32, the base station determines the third TDRA table as the target TDRA table.

In another possible implementation, the base station may determine the target TDRA table based on first auxiliary information reported by the terminal. The first auxiliary information includes, but is not limited to, a decoding performance of the terminal on previously received downlink data, and a measurement result of a reception quality of a downlink channel measured by the terminal.

At step 1203, a target RRC signaling for indicating the target TDRA table is sent.

At step 1204, second DCI is sent.

In the embodiment of the disclosure, the second DCI is configured to indicate the terminal to determine the number of actual repetitions of repeatedly transmitting the target PUSCH in the target TDRA table. If the number of rows in the third TDRA table does not exceed 16, the number of bits occupied by the information field in the second DCI for indicating the number of actual repetitions is a preset number.

In the above embodiment, the base station sends the RRC parameter for indicating the terminal the maximum number of repetitions of repeatedly transmitting the target PUSCH, further determines the target TDRA table in the at least two TDRA tables, indicates the target TDRA table by the target RRC signaling, and dynamically select the number of actual repetitions of repeatedly transmitting the target PUSCH from the target TDRA table via the second DCI, which increases the number of actual repetitions of repeatedly transmitting the PUSCH, and improves the uplink coverage performance.

Figure 13:
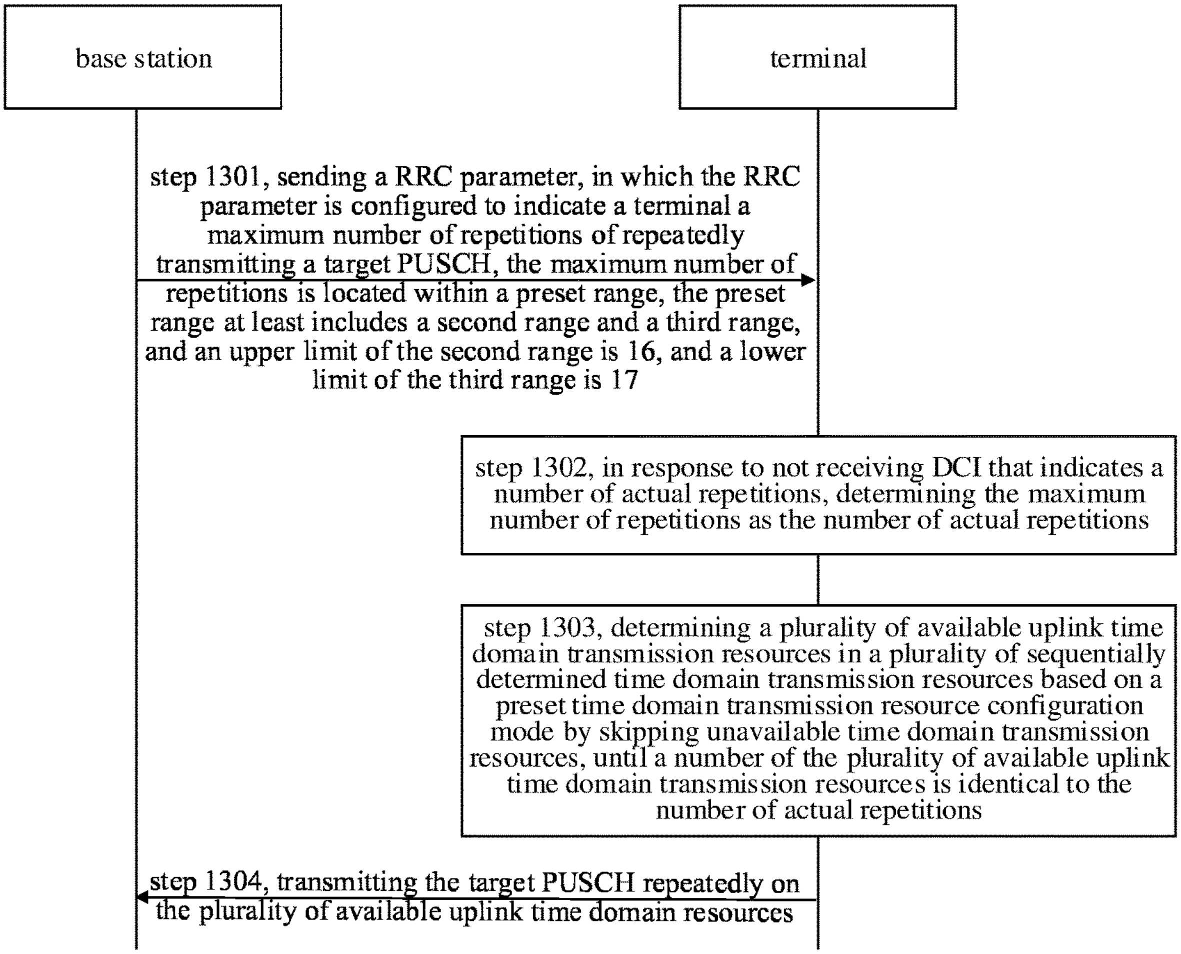
FIG. 13 is a flowchart of a channel transmission method according to an exemplary embodiment.

In some optional embodiments, as illustrated in FIG. 13, FIG. 13 is a flowchart of a channel transmission method according to an embodiment. The method includes the following steps.

At step 1301, a base station sends a RRC parameter, in which the RRC parameter is configured to indicate a terminal a maximum number of repetitions of repeatedly transmitting a target PUSCH, and the maximum number of repetitions is located within a preset range. The preset range at least includes a second range and a third range, and an upper limit of the second range is 16, and a lower limit of the third range is 17.

At step 1302, in response to not receiving DCI that indicates a number of actual repetitions, the terminal determines the maximum number of repetitions as the number of actual repetitions.

In the embodiment of the disclosure, the maximum number of repetitions is 32, so the number of actual repetitions is also 32.

At step 1303, the terminal determines a plurality of available uplink time domain transmission resources in a plurality of sequentially determined time domain transmission resources based on a preset time domain transmission resource configuration mode by skipping unavailable time domain transmission resources, until a number of the plurality of available uplink time domain transmission resources is identical to the number of actual repetitions.

In the embodiment of the disclosure, the unavailable time domain transmission resources include, but are not limited to, downlink time domain transmission resources, and determining the plurality of available uplink time domain transmission resources is executed in the same manner as described above for step 103, and will not be repeated herein.

At step 1304, the terminal transmits the target PUSCH repeatedly on the plurality of available uplink time domain resources.

In the above embodiment, the counting mode for counting the number of actual repetitions is modified, and at least two TDRA tables are maintained in the specification, which increases the number of actual repetitions of repeatedly transmitting the PUSCH, and improves the uplink coverage performance.

In some optional embodiments, as illustrated in FIG. 14, FIG. 14 is a flowchart of a channel transmission method according to an embodiment. The method may include the following steps.

At step 1401, a base station sends a RRC parameter, in which the RRC parameter is configured to indicate a terminal a maximum number of repetitions of repeatedly transmitting a target PUSCH, and the maximum number of repetitions is located within a preset range. The preset range at least includes a second range and a third range, and an upper limit of the second range is 16, and a lower limit of the third range is 17.

At step 1402, the base station determines a target TDRA table at least from a second TDRA table corresponding to the second range and a third TDRA table corresponding to the third range.

At step 1403, the base station sends a target RRC signaling for indicating the target TDRA table.

At step 1404, the base station sends second DCI.

The second DCI is configured to indicate the terminal to determine a number of actual repetitions of repeatedly transmitting the target PUSCH in the target TDRA table.

At step 1405, the terminal determines a number of actual repetitions indicated by second DCI in the target TDRA table.

At step 1406, the terminal determines a plurality of available uplink time domain transmission resources in a plurality of sequentially determined time domain transmission resources based on a preset time domain transmission resource configuration mode by skipping unavailable time domain transmission resources, until a number of the plurality of available uplink time domain transmission resources is identical to the number of actual repetitions.

In the embodiment of the disclosure, the unavailable time domain transmission resources include, but are not limited to, downlink time domain transmission resources, and determining the plurality of available uplink time domain transmission resources is executed in the same manner as described above for step 103, and will not be repeated herein.

At step 1407, the terminal transmits the target PUSCH repeatedly on the plurality of available uplink time domain resources.

In the above embodiment, the counting mode for counting the number of actual repetitions is modified, and at least two TDRA tables are maintained in the specification, which increases the number of actual repetitions of repeatedly transmitting the PUSCH, and improves the uplink coverage performance.

In addition to the above two channel transmission solutions, the disclosure also provides another channel transmission solution, which is provided as follows.

In a third solution, the counting mode for counting the number of actual repetitions is modified, the TDRA table remains unchanged, and the terminal automatically expands the number of actual repetitions.

The third solution will be introduced from the terminal side first below.

Figure 15:
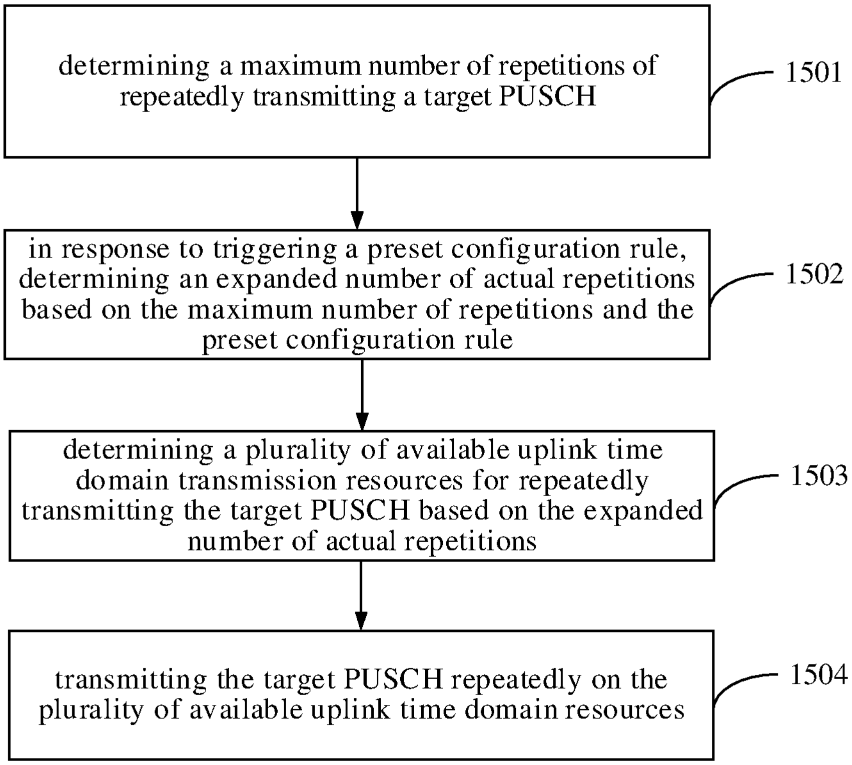
FIG. 15 is a flowchart of a channel transmission method according to an exemplary embodiment.

As illustrated in FIG. 15, FIG. 15 is a flowchart of a channel transmission method according to an embodiment. The method is performed by a terminal. The method includes the following steps.

At step 1501, a maximum number of repetitions of repeatedly transmitting a target PUSCH is determined.

In the embodiment of the disclosure, a base station can send the configured maximum number of repetitions to the terminal through a RRC parameter configuration.

At step 1502, in response to triggering a preset configuration rule, an expanded number of actual repetitions is determined based on the maximum number of repetitions and the preset configuration rule.

In the embodiment of the disclosure, if the preset configuration rule is not triggered, the terminal can directly determine the maximum number of repetitions as the number of actual repetitions in response to not receiving an indication of DCI. If the terminal receives the indication of the DCI, it can determine the number of repetitions of PUSCH indicated by the DCI in the already existed fourth TDRA table agreed upon in the specification, to obtain the number of actual repetitions, in which an upper limit of the number of repetitions of PUSCH included in the fourth TDRA table is 16.

The preset configuration rule is configured to expand the number of actual repetitions of repeatedly transmitting the target PUSCH. If the terminal determines that the preset configuration rule is triggered, it needs to expand the number of actual repetitions based on the number of actual repetitions and the preset configuration rule after determining the number of actual repetitions. The expanded number of actual repetitions is greater than 16.

At step 1503, a plurality of available uplink time domain transmission resources for repeatedly transmitting the target PUSCH is determined based on the expanded number of actual repetitions.

In the embodiment of the disclosure, the terminal determines the plurality of available uplink time domain transmission resources in a plurality of sequentially determined time domain transmission resources based on a preset time domain transmission resource configuration mode by skipping unavailable time domain transmission resources, until a number of the plurality of available uplink time domain transmission resources is identical to the number of actual repetitions. The unavailable time domain transmission resources include, but are not limited to, downlink time domain transmission resources.

At step 1504, the target PUSCH is transmitted repeatedly on the plurality of available uplink time domain resources.

In the above embodiment, the preset configuration rule can be triggered by the terminal, to expand the number of actual repetitions, which increases the number of actual repetitions of repeatedly transmitting the PUSCH, and improves the uplink coverage performance.

In a possible implementation, the terminal determines that the preset configuration rule is triggered if the maximum number of repetitions indicated by the received RRC configuration parameter is greater than 16.

In another possible implementation, upon receiving a specific RRC parameter and/or a specific signaling for triggering the preset configuration rule, the terminal determines that the preset configuration rule is triggered. The specific RRC parameter may be a newly added RRC parameter dedicated to triggering the preset configuration rule. The specific signaling may be a newly added signaling dedicated to triggering the preset configuration rule, which includes but is not limited to a media access control control element (MAC CE) signaling, or DCI.

In another possible implementation, the terminal determines that the preset configuration rule is triggered in a case that the maximum number of repetitions indicated by the received RRC configuration parameter is greater than 16 and that a specific RRC parameter and/or a specific signaling for triggering the preset configuration rule is received.

Figure 16:
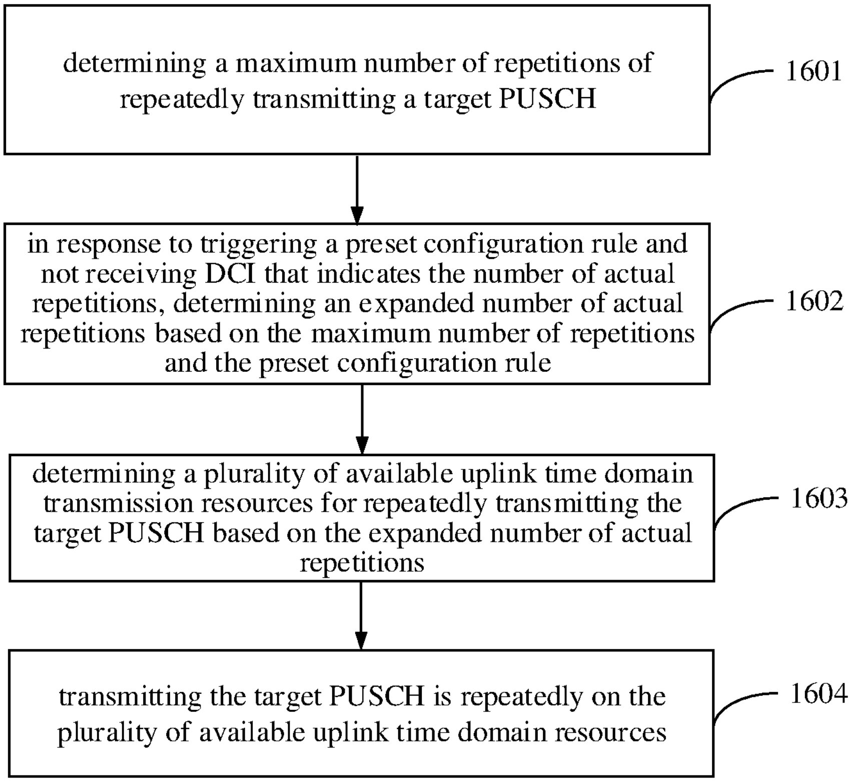
FIG. 16 is a flowchart of a channel transmission method according to an exemplary embodiment.

As illustrated in FIG. 16, FIG. 16 is a flowchart of a channel transmission method according to an embodiment. The method is performed by a terminal. The method may include the following steps.

At step 1601, a maximum number of repetitions of repeatedly transmitting a target PUSCH is determined.

At step 1602, in response to triggering a preset configuration rule and not receiving DCI that indicates the number of actual repetitions, an expanded number of actual repetitions is determined based on the maximum number of repetitions and the preset configuration rule.

In the embodiment of the disclosure, it may be determined that the preset configuration rule is triggered if the RRC parameter indicates that the maximum number of repetitions is greater than 16. Alternatively, if the terminal receives a specific parameter or a specific signaling for triggering the preset configuration rule, it determines that the preset configuration rule is triggered.

Further, if the preset configuration rule is triggered and the maximum number of repetitions of repeatedly transmitting the target PUSCH indicated by the RRC parameter is greater than 16, the terminal may directly determine the maximum number of repetitions as the expanded number of actual repetitions.

Alternatively, if the preset configuration rule is triggered and the maximum number of repetitions of repeatedly transmitting the target PUSCH indicated by the RRC parameter is less than or equal to 16, the terminal may determine the maximum number of repetitions as the number of actual repetitions, and expand the number of actual repetitions based on the preset configuration rule, to obtain the expanded number of actual repetitions.

In the embodiment of the disclosure, the expanded number K' of actual repetitions may be an operational value result of the number of actual repetitions and the preset configuration rule. The preset rule may include, but is not limited to, a sum operation with a preset value. The preset value may be determined according to the expanded number of actual repetitions. Optionally, the expanded number K' of actual repetitions may be determined using an equation, including but is not limited to, the following equation:

$$K'=K+M \quad \text{equation 1}$$

where K' is the expanded number of actual repetitions, K is the number of actual repetitions, and M is the preset value, which may be 16, 32, 64, and so on.

At step 1603, a plurality of available uplink time domain transmission resources for repeatedly transmitting the target PUSCH are determined based on the expanded number of actual repetitions.

At step 1604, the target PUSCH is repeatedly transmitted on the plurality of available uplink time domain resources.

In the above embodiment, the terminal can trigger the preset configuration rule and expand the number of actual repetitions, which increases the number of actual repetitions of repeatedly transmitting the PUSCH, and improves the uplink coverage performance.

Figure 17:
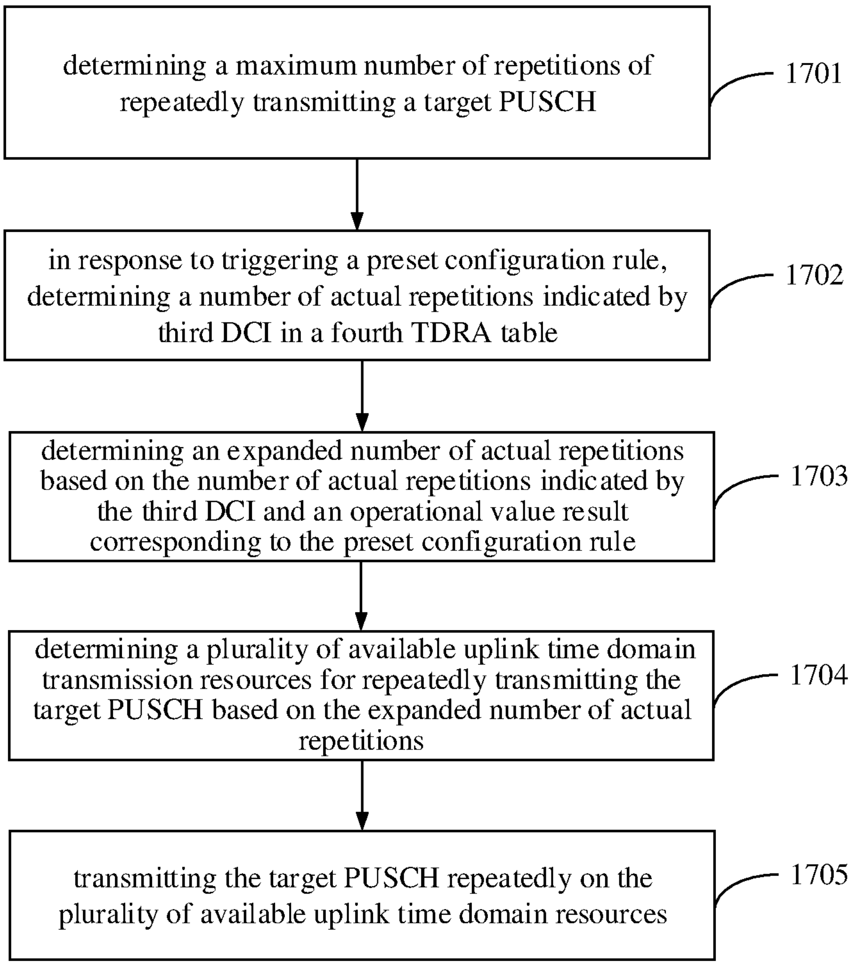
FIG. 17 is a flowchart of a channel transmission method according to an exemplary embodiment.

As illustrated in FIG. 17, FIG. 17 is a flowchart of a channel transmission method according to an embodiment. The method is performed by a terminal. The method may include the following steps.

At step 1701, a maximum number of repetitions of repeatedly transmitting a target PUSCH is determined.

At step 1702, in response to triggering a preset configuration rule, a number of actual repetitions indicated by third DCI is determined in a fourth TDRA table.

In the embodiment of the disclosure, an upper limit of a number of repetitions of PUSCH included in the fourth TDRA table is 16. Optionally, the fourth TDRA table is a TDRA table agreed in the existing specification.

At step 1703, an expanded number of actual repetitions is determined based on the number of actual repetitions indicated by the third DCI and an operational value result corresponding to the preset configuration rule.

In the embodiment of the disclosure, the expanded number of actual repetitions can be determined by using an equation, including but is not limited to the above equation 1.

At step 1704, a plurality of available uplink time domain transmission resources for repeatedly transmitting the target PUSCH is determined based on the expanded number of actual repetitions.

At step 1705, the target PUSCH is transmitted repeatedly on the plurality of available uplink time domain resources.

In the above embodiment, the terminal can trigger the preset configuration rule and expand the number of actual repetitions, which increases the number of actual repetitions of repeatedly transmitting the PUSCH, and improves the uplink coverage performance.

In some optional embodiments, the terminal may report second auxiliary information to a base station, and the second auxiliary information is used to assist the base station in determining that the terminal triggers the preset configuration rule. Optionally, the second auxiliary information may be the same as the first auxiliary information, including, but not limited to, a decoding performance of the terminal on previously received downlink data, and a measurement result of a reception quality of a downlink channel measured by the terminal.

Figure 18:
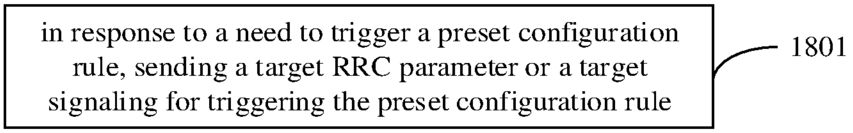
FIG. 18 is a flowchart of a channel transmission method according to an exemplary embodiment.

Next, the third channel transmission solution provided by the disclosure will be introduced from a base station side below. As illustrated in FIG. 18, FIG. 18 is a flowchart of a channel transmission method according to an embodiment. The method is performed by a base station. The method includes the following steps.

At step 1801, in response to a need to trigger a preset configuration rule, a target RRC parameter or a target signaling for triggering the preset configuration rule is sent, in which the preset configuration rule is configured for a terminal to expand a number of actual repetitions of repeatedly transmitting a target PUSCH.

In the embodiment of the disclosure, the base station may determine that triggering the preset configuration rule is needed, using a mode, including but is not limited to, the following modes.

In a possible implementation, the base station may determine that triggering the preset configuration rule is needed based on a network side coverage enhancement target.

In another possible implementation, the base station may determine that triggering the preset configuration rule is needed based on a measurement result of measuring a reception quality of an uplink channel.

In another possible implementation, the base station may determine that triggering the preset configuration rule is needed based on second assistance information reported by a terminal. The second auxiliary information includes but is not limited to, a decoding performance of the terminal on previously received downlink data, and a measurement result of a reception quality of a downlink channel measured by the terminal.

In the embodiment of the disclosure, the target RRC parameter sent by the base station may use an existing RRC parameter to trigger the preset configuration rule at the terminal side. Optionally, the target RRC parameter includes an RRC parameter for indicating the maximum number of repetitions of repeatedly transmitting the target PUSCH for the terminal, including but is not limited to, pusch-AggregationFactor. Alternatively, the target RRC parameter sent by the base station may use a newly added RRC parameter dedicated to triggering the preset configuration rule.

The target signaling sent by the base station may include, but is not limited to, a specific signaling for triggering the preset configuration rule, which may include, but is not limited to, a MAC CE signaling, and DCI.

In the above embodiment, the base station may trigger the preset configuration rule by means of the target RRC parameter or the target signaling, and the terminal may expand the number of actual repetitions of repeatedly transmitting the target PUSCH based on the preset configuration rule, which increases the number of actual repetitions of repeatedly transmitting the PUSCH, and improves the uplink coverage performance.

Corresponding to the above embodiments of the channel transmission method, the disclosure also provides embodiments of a channel transmission apparatus.

Figure 19:
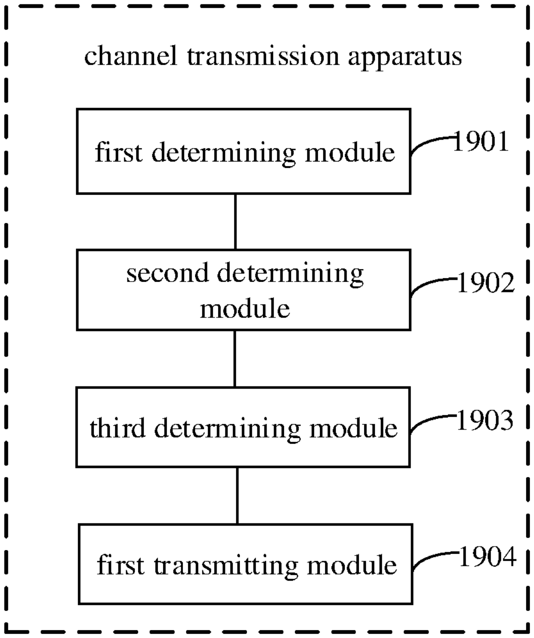
FIG. 19 is a block diagram of a channel transmission apparatus according to an exemplary embodiment.

As illustrated in FIG. 19, FIG. 19 is a block diagram of a channel transmission apparatus according to an exemplary embodiment. The apparatus is applied to a terminal. The apparatus includes:

a first determining module 1901, configured to determine a maximum number of repetitions of repeatedly transmitting a target PUSCH, the maximum number of repetitions being located within a preset range;

a second determining module 1902, configured to determine a number of actual repetitions based on the maximum number of repetitions;

a third determining module 1903, configured to determine a plurality of available uplink time domain transmission resources for repeatedly transmitting the target PUSCH based on the number of actual repetitions; and a first transmitting module 1904, configured to transmit the target PUSCH repeatedly on the plurality of available uplink time domain resources.

Figure 20:
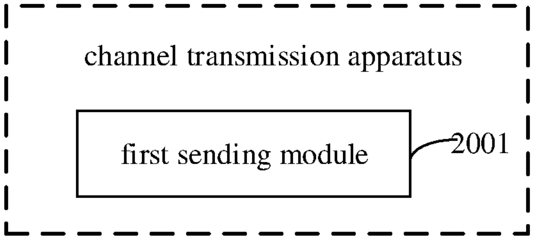
FIG. 20 is a block diagram of a channel transmission apparatus according to an exemplary embodiment.

As illustrated in FIG. 20, FIG. 20 is a block diagram of a channel transmission apparatus according to an exemplary embodiment. The apparatus is applied to a base station. The apparatus includes:

a first sending module 2001, configured to send a RRC parameter, in which the RRC parameter is configured to indicate a terminal a maximum number of repetitions of repeatedly transmitting a target PUSCH, and the maximum number of repetitions is located within a preset range.

Figure 21:
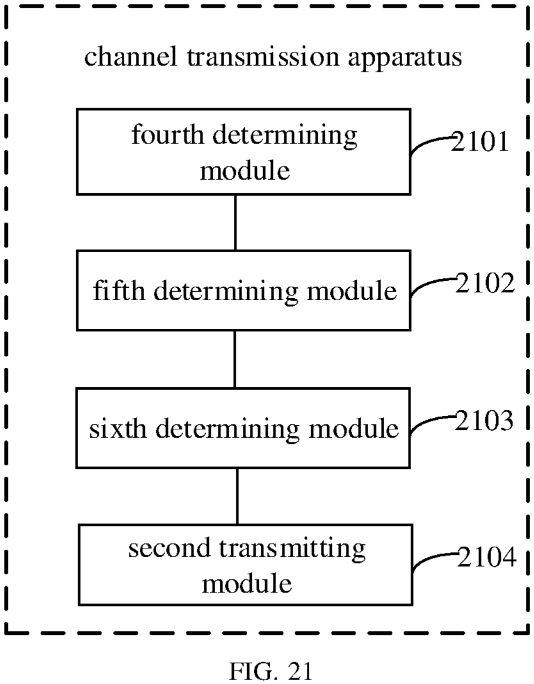
FIG. 21 is a block diagram of a channel transmission apparatus according to an exemplary embodiment.

As illustrated in FIG. 21, FIG. 21 is a block diagram of a channel transmission apparatus according to an exemplary embodiment. The apparatus is applied to a terminal. The apparatus includes:

a fourth determining module 2101, configured to determine a maximum number of repetitions of repeatedly transmitting a target PUSCH;

a fifth determining module 2102, configured to, in response to triggering a preset configuration rule, determine an expanded number of actual repetitions based on the maximum number of repetitions and a preset configuration rule, in which the preset configuration rule is configured to expand a number of actual repetitions of repeatedly transmitting the target PUSCH;

a sixth determining module 2103, configured to determine a plurality of available uplink time domain transmission resources for repeatedly transmitting the target PUSCH based on the expanded number of actual repetitions; and a second transmitting module 2104, configured to transmit the target PUSCH repeatedly on the plurality of available uplink time domain transmission resources.

Figure 22:
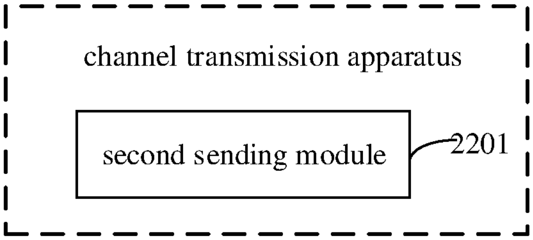
FIG. 22 is a block diagram of a channel transmission apparatus according to an exemplary embodiment.

As illustrated in FIG. 22, FIG. 22 is a block diagram of a channel transmission apparatus according to an exemplary embodiment. The apparatus is applied to a base station. The apparatus includes:

a second sending module 2201, configured to, in response to a need to trigger a preset configuration rule, send a target RRC parameter or a target signaling for triggering the preset configuration rule, in which the preset configuration rule is configured for a terminal to expand a number of actual repetitions of repeatedly transmitting a target PUSCH.

Since the apparatus embodiments basically correspond to the method embodiments, the related contents can refer to part of the descriptions of the method embodiments. The above-described apparatus embodiments are merely schematic, the units described above as separate components may or may not be physically separated, and the components displayed as units may or may not be physical units, i.e., the units may be located in one area or may be distributed to multiple network units. Some or all of these modules can be selected according to practical needs to achieve the purpose of the solution of the disclosure. Those skilled in the art can understand and implement the solution without inventive works.

Correspondingly, the disclosure also provides a computer-readable storage medium having computer programs stored thereon. The computer programs are configured to perform any channel transmission method described above performed at the terminal side.

Correspondingly, the disclosure also provides a computer-readable storage medium having computer programs stored thereon. The computer programs are configured to perform any channel transmission method described above performed at the base station side.

Correspondingly, the disclosure also provides a channel transmission device. The channel transmission device includes:

a processor;

a memory for storing instructions executable by the processor; in which the processor is configured to implement any channel transmission method performed at the terminal side.

Figure 23:
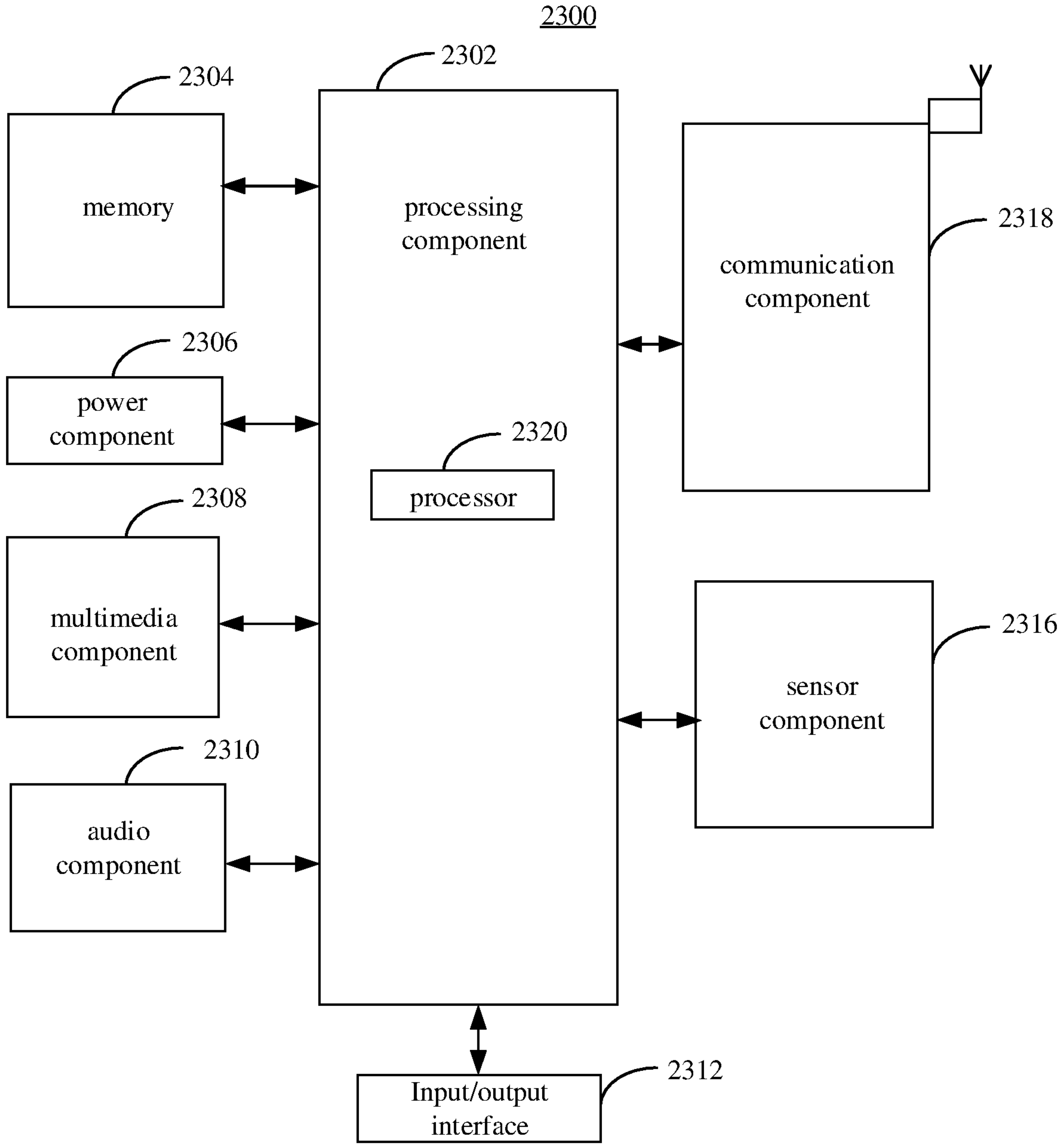
FIG. 23 is a schematic diagram of a channel transmission device according to an exemplary embodiment.

FIG. 23 is a block diagram of an electronic device 2300 according to an exemplary embodiment. For example, the electronic device 2300 may be a cell phone, a tablet computer, an e-book reader, a multimedia playback device, a wearable device, an in-vehicle terminal, an ipad, a smart TV, and other terminals.

As illustrated in FIG. 23, the electronic device 2300 may include one or more of the following components: a processing component 2302, a memory 2304, a power component 2306, a multimedia component 2308, an audio component 2310, an input/output (I/O) interface 2312, a sensor component 2316, and a communication component 2318.

The processing component 2302 typically controls overall operations of the electronic device 2300, such as the operations associated with display, telephone calls, data channel communications, camera operations, and recording operations. The processing component 2302 may include one or more processors 2320 to perform instructions to implement all or part of the steps in the above described method. Moreover, the processing component 2302 may include one or more modules which facilitate the interaction between the processing component 2302 and other components. For example, the processing component 2302 may include a multimedia module to facilitate the interaction between the multimedia component 2308 and the processing component 2302. For another example, the processing component 2302 may read executable instructions from the memory, to implement the steps of the method provided in any of the above embodiments.

The memory 2304 is configured to store various types of data to support the operations of the electronic device 2300. Examples of such data include instructions for any applications or methods operated on the electronic device 2300, contact data, phonebook data, messages, pictures, videos, etc. The memory 2304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 2306 provides power to various components of the electronic device 2300. The power component 2306 may include a power management system, one or more power sources, and any other components associated with the generation, management, and distribution of power in the electronic device 2300.

The multimedia component 2308 includes a screen providing an output interface between the electronic device 2300 and a user. In some embodiments, the multimedia component 2308 includes a front-facing camera and/or a rear-facing camera. When the electronic device 2300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 2310 is configured to output and/or input audio signals. For example, the audio component 2310 includes a microphone (MIC) configured to receive an external audio signal when the electronic device 2300 is in an operation mode, such as a calling mode, a recording mode, and a voice recognition mode. The received audio signal may be further stored in the memory 2304 or transmitted via the communication component 2318. In some embodiments, the audio component 2310 further includes a speaker to output audio signals.

The I/O interface 2312 provides an interface between the processing component 2302 and peripheral interface modules, such as a keyboard, a click wheel, buttons, and the like. The buttons may include, but are not limited to, a home button, a volume button, a starting button, and a locking button.

The sensor component 2316 includes one or more sensors to provide status assessments of various aspects of the electronic device 2300. For instance, the sensor component 2316 may detect an open/closed status of the electronic device 2300, relative positioning of components, e.g., the display and the keypad, of the electronic device 2300, a change in position of the electronic device 2300 or a component of the electronic device 2300, a presence or absence of a user contact with the electronic device 2300, an orientation or an acceleration/deceleration of the electronic device 2300, and a change in temperature of the electronic device 2300. The sensor component 2316 may include a proximity sensor configured to detect the presence of nearby objects without any physical contact. The sensor component 2316 may also include a light sensor, such as a Complementary Metal Oxide Semiconductor (CMOS) or Charge-Coupled Device (CCD) image sensor, for use in imaging applications. In some embodiments, the sensor component 2316 may also include an accelerometer sensor, a gyroscope sensor, a magnetic sensor, a pressure sensor, or a temperature sensor.

The communication component 2318 is configured to facilitate communication, wired or wirelessly, between the electronic device 2300 and other devices. The electronic device 2300 can access a wireless network based on a communication standard, such as WiFi, 2G, 3G, 4G, 5G, 6G or a combination thereof. In an exemplary embodiment, the communication component 2318 receives a broadcast signal from an external broadcast management system or broadcast associated information via a broadcast channel. In an exemplary embodiment, the communication component 2318 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the electronic device 2300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In the exemplary embodiments, there is also provided a non-transitory computer readable storage medium including instructions, such as the memory 2304. The instructions are executable by the processor 2320 in the electronic device 2300, for implementing the above methods. For example, the non-transitory computer-readable storage medium may be a ROM, a Random Access Memory (RAM), a CD-ROM, a magnetic tape, a floppy disc, and an optical data storage device.

Correspondingly, the disclosure also provides a channel transmission device. The channel transmission device includes:

a processor;

a memory for storing instructions executable by the processor; in which the processor is configured to implement any of the channel transmission methods performed at the base station side.

Figure 24:
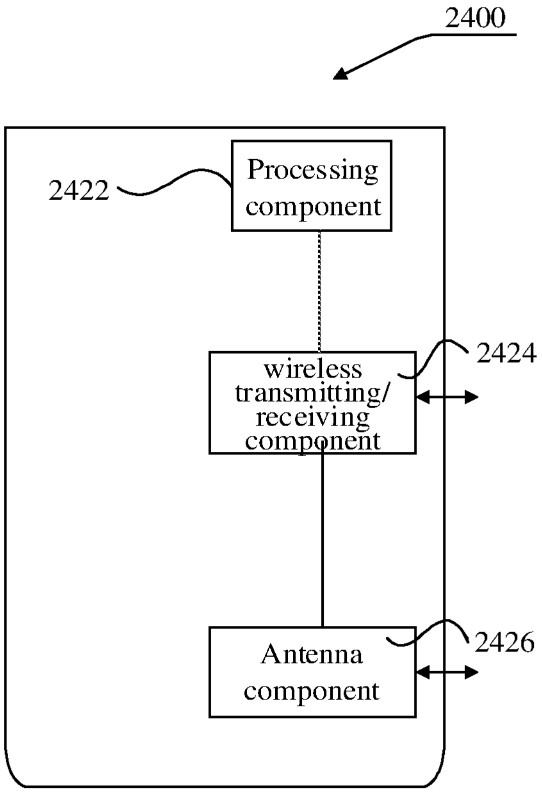
FIG. 24 is a schematic diagram of a channel transmission device according to an exemplary embodiment.

As illustrated in FIG. 24, FIG. 24 is a schematic diagram of another channel transmission device 2400 according to an exemplary embodiment. The device 2400 may be provided as a base station. As illustrated in FIG. 24, the device 2400 includes a processing component 2422, a wireless transmitting/receiving component 2424, an antenna component 2426, and a signal processing portion specific to a wireless interface. The processing component 2422 may further include one or more processors.

One of the processors in the processing component 2422 may be configured for performing any of the channel transmission methods described above that are performed by the base station.

The technical solutions provided by the embodiments of the disclosure may include the following beneficial effects.

In the embodiments of the disclosure, the terminal may determine the maximum number of repetitions of repeatedly transmitting the target PUSCH, the maximum number of repetitions being located within the preset range. The terminal determines the number of actual repetitions based on the maximum number of repetitions, and determines the plurality of available uplink time domain transmission resources based on the number of actual repetitions. Thus, the terminal can transmit the target PUSCH repeatedly on the plurality of available uplink time domain resources. In the disclosure, the number of actual repetitions of repeatedly transmitting the PUSCH is increased, and the uplink coverage performance is improved.

In the embodiments of the disclosure, the terminal may expand the number of actual repetitions, determines the plurality of available uplink time domain transmission resources for repeatedly transmitting the target PUSCH based on the expanded number of actual repetitions, and transmits the target PUSCH repeatedly on the plurality of available uplink time domain transmission resources. In the disclosure, the number of actual repetitions of repeatedly transmitting the PUSCH is increased, and the uplink coverage performance is improved.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A channel transmission method, performed by a terminal, comprising: determining a maximum number of repetitions of repeatedly transmitting a target physical uplink shared channel (PUSCH), the maximum number of repetitions being located within a preset range; determining a number of actual repetitions based on the maximum number of repetitions; determining a plurality of available uplink time domain transmission resources for repeatedly transmitting the target PUSCH based on the number of actual repetitions; transmitting the target PUSCH repeatedly on the plurality of available uplink time domain resources; and reporting first assistance information assisting a base station in determining a target TDRA table;

wherein the first assistance information comprises at least one of a decoding performance of the terminal on previously received downlink data, or a measurement result of a reception quality of a downlink channel measured by the terminal, and the target TDRA table is used for the terminal to determine the number of actual repetitions.

2. The method of claim 1, wherein the preset range comprises a first range, and an upper limit of the first range is greater than 16; or the preset range comprises a second range and a third range, and an upper limit of the second range is 16, and a lower limit of the third range is 17.

3. The method of claim 2, wherein determining the number of actual repetitions based on the maximum number of repetitions comprises: when downlink control information (DCI) that indicates the number of actual repetitions is not received, determining the maximum number of repetitions as the number of actual repetitions.

4. The method of claim 2, wherein determining the number of actual repetitions based on the maximum number of repetitions comprises: receiving DCI that indicates the number of actual repetitions; and determining the number of actual repetitions in at least one time domain resource allocation (TDRA) table corresponding to the preset range based on an indication of the DCI.

5. The method of claim 4, wherein the preset range comprises the first range, and determining the number of actual repetitions in the at least one TDRA table corresponding to the preset range based on the indication of the DCI comprises: determining the number of actual repetitions indicated by first DCI in a first TDRA table corresponding to the first range.

6. The method of claim 5, wherein a number of bits occupied by an information field for indicating the number of actual repetitions in the first DCI is greater than a preset number.

7. The method of claim 4, wherein the preset range comprises the second range and the third range, and determining the number of actual repetitions in the at least one TDRA table corresponding to the preset range based on the indication of the DCI comprises: determining a target TDRA table from a second TDRA table corresponding to the second range and a third TDRA table corresponding to the third range; and determining the number of actual repetitions indicated by second DCI in the target TDRA table.

8. The method of claim 7, wherein determining the target TDRA table from the second TDRA table corresponding to the second range and the third TDRA table corresponding to the third range comprises: determining the target TDRA table from the second TDRA table and the third TDRA table based on an indication of a received target radio resource control (RRC) signaling.

9. The method of claim 7, wherein a number of bits occupied by an information field for indicating the number of actual repetitions in the second DCI is a preset number.

10. The method of claim 1, wherein determining the plurality of available uplink time domain transmission resources for repeatedly transmitting the target PUSCH based on the number of actual repetitions comprises: determining the plurality of available uplink time domain transmission resources in a plurality of sequentially determined time domain transmission resources based on a preset time domain transmission resource configuration mode by skipping unavailable time domain transmission resources, until a number of the plurality of available uplink time domain transmission resources is identical to the number of actual repetitions.

11. A channel transmission method, performed by a base station, comprising: sending a radio resource control (RRC) parameter, wherein the RRC parameter is configured to indicate to a terminal a maximum number of repetitions of repeatedly transmitting a target physical uplink shared channel (PUSCH), and the maximum number of repetitions is located within a preset range;

receiving first assistance information assisting the base station in determining a target TDRA table;

wherein the first assistance information comprises at least one of a decoding performance of the terminal on previously received downlink data, or a measurement result of a reception quality of a downlink channel measured by the terminal, and the target TDRA table is used for the terminal to determine the number of actual repetitions.

12. The method of claim 11, wherein the preset range comprises a first range, and an upper limit of the first range is greater than 16; or the preset range comprises a second range and a third range, and an upper limit of the second range is 16, and a lower limit of the third range is 17.

13. The method of claim 12, further comprising: sending first downlink control information (DCI), wherein the first DCI is configured to indicate the terminal to determine a number of actual repetitions of repeatedly transmitting the target PUSCH in a first time domain resource allocation (TDRA) table corresponding to the first range.

14. The method of claim 13, wherein a number of bits occupied by an information field for indicating the number of actual repetitions in the first DCI is greater than a preset number.

15. The method of claim 12, further comprising: determining a target TDRA table from a second TDRA table corresponding to the second range and a third TDRA table corresponding to the third range; sending a target RRC signaling for indicating the target TDRA table; and sending second DCI, wherein the second DCI is configured to indicate the terminal to determine a number of actual repetitions of repeatedly transmitting the target PUSCH in the target TDRA table.

16. The method of claim 15, wherein determining the target TDRA table from the second TDRA table corresponding to the second range and the third TDRA table corresponding to the third range comprises any one of: determining the target TDRA table from the second TDRA table and the third TDRA table based on a network side coverage enhancement target; determining the target TDRA table from the second TDRA table and the third TDRA table based on a measurement result of measuring a reception quality of an uplink channel; or determining the target TDRA table from the second TDRA table and the third TDRA table based on the first assistance information.

17. The method of claim 15, wherein a number of bits occupied by an information field for indicating the number of actual repetitions in the second DCI is a preset number.

18. A channel transmission device, comprising: a processor; and a memory for storing instructions executable by the processor; wherein the processor is configured to:

determine a maximum number of repetitions of repeatedly transmitting a target physical uplink shared channel (PUSCH), the maximum number of repetitions being located within a preset range;

determine a number of actual repetitions based on the maximum number of repetitions;

determine a plurality of available uplink time domain transmission resources for repeatedly transmitting the target PUSCH based on the number of actual repetitions;

transmit the target PUSCH repeatedly on the plurality of available uplink time domain resources;

report first assistance information assisting a base station in determining a target TDRA table;

wherein the first assistance information comprises at least one of a decoding performance of the terminal on previously received downlink data, or a measurement result of a reception quality of a downlink channel measured by the terminal, and the target TDRA table is used for the terminal to determine the number of actual repetitions.

19. A channel transmission device, comprising: a processor; and a memory for storing instructions executable by the processor; wherein the processor is configured to perform the method of claim 11.

* * * * *